US012595381B2

(12) United States Patent
Pinger

(10) Patent No.: US 12,595,381 B2
(45) Date of Patent: Apr. 7, 2026

(54) METHOD FOR THE PRODUCTION OF STEEL COMPONENTS WITH FIRE RESISTANCE

(71) Applicant: Fontaine Holdings NV, Houthalen (BE)

(72) Inventor: Thomas Pinger, Houthalen (BE)

(73) Assignee: Fontaine Holdings NV, Houthalen (BE)

( * ) Notice: Subject to any disclaimer, the term of this patent is extended or adjusted under 35 U.S.C. 154(b) by 103 days.

(21) Appl. No.: 18/566,647

(22) PCT Filed: Jun. 2, 2022

(86) PCT No.: PCT/EP2022/065045
§ 371 (c)(1),
(2) Date: Dec. 3, 2023

(87) PCT Pub. No.: WO2022/253956
PCT Pub. Date: Dec. 8, 2022

(65) Prior Publication Data
US 2024/0352262 A1 Oct. 24, 2024

(30) Foreign Application Priority Data

| | | |
|---|---|---|
| Jun. 4, 2021 | (DE) | ..................... 10 2021 002 872.4 |
| Jun. 8, 2021 | (DE) | ..................... 10 2021 002 896.1 |
| Jun. 22, 2021 | (DE) | ..................... 10 2021 116 159.2 |

(51) Int. Cl.
*C09D 5/18* (2006.01)
*C09D 1/00* (2006.01)
*C22C 18/04* (2006.01)

*C23C 2/02* (2006.01)
*C23C 2/06* (2006.01)
*C23C 2/30* (2006.01)
*E04B 1/94* (2006.01)

(52) U.S. Cl.
CPC ................. *C09D 5/18* (2013.01); *C09D 1/00* (2013.01); *C22C 18/04* (2013.01); *C23C 2/024* (2022.08); *C23C 2/06* (2013.01); *C23C 2/30* (2013.01); *E04B 1/941* (2013.01)

(58) Field of Classification Search
CPC .. C09D 5/18; C09D 1/00; C23C 2/024; C23C 2/06; C23C 2/30; C22C 18/04; E04B 1/941
See application file for complete search history.

(56) References Cited

U.S. PATENT DOCUMENTS

| | | | | |
|---|---|---|---|---|
| 2,642,834 | A | * 6/1953 | Pearson .................. | C23C 2/385 |
| | | | | 118/74 |
| 9,724,697 | B2 | * 8/2017 | Steed ...................... | B02C 17/22 |
| 2013/0118646 | A1 | * 5/2013 | Kobayashi ........... | B21D 22/022 |
| | | | | 148/511 |
| 2014/0185650 | A1 | * 7/2014 | Yamada .................... | C23C 2/29 |
| | | | | 374/45 |

(Continued)

*Primary Examiner* — Gisele D Ford
(74) *Attorney, Agent, or Firm* — Brannon Sowers & Cracraft PC; Edward E. Sowers

(57) ABSTRACT

The present invention relates to a method for generating (producing) blaze resistance and/or fire resistance on steel components and/or for providing (equipping) steel components with blaze resistance and/or fire resistance, especially a method for generating (producing) blaze-resistant and/or fire-resistant steel components.

20 Claims, 3 Drawing Sheets

(56)　　　　　　References Cited

U.S. PATENT DOCUMENTS

| | | | |
|---|---|---|---|
| 2019/0048452 A1* | 2/2019 | Pinger | C23C 2/14 |
| 2019/0078187 A1* | 3/2019 | Pinger | C23C 2/0035 |
| 2019/0100830 A1* | 4/2019 | Pinger | C23C 2/02 |
| 2019/0144983 A1* | 5/2019 | Pinger | C23C 2/26 |
| | | | 427/310 |
| 2021/0164086 A1* | 6/2021 | Pinger | C23C 2/06 |

* cited by examiner

METHOD FOR THE PRODUCTION OF STEEL COMPONENTS WITH FIRE RESISTANCE

This application is a National Stage filing of International Application Application PCT/EP 2022/065045 (WO 2022/253956) filed Jun. 2, 2022, entitled "METHOD FOR PRODUCING STEEL COMPONENTS WITH RESISTANCE TO FIRE" claiming priority to DE 10 2021 002 872.4 filed Jun. 4, 2021, DE 10 2021 002 896.1 filed Jun. 8, 2021, and DE 10 2021 116 159.2 filed Jun. 22, 2021. The subject application claims priority to DE 10 2021 002 872.4, DE 10 2021 002 896.1, DE 10 2021 116 159.2 and PCT/EP 2022/065045 and incorporates all by reference herein, in their entirety.

BACKGROUND OF THE INVENTION

The present invention relates to the technical field of fire protection, especially structural fire protection, but also fire protection in other technical fields (such as automotive and/or vehicle manufacturing).

Especially, the present invention relates to a method for generating (producing) blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2: 2016-12 and/or DIN 4102-2:1977-09, especially a method for generating (producing) a blaze-resistant and/or fire-resistant steel component, especially a blaze-resistant and/or fire-resistant steel component in accordance with DIN EN 13501-2:2016-12 and/or DIN 4102-2:1977-09.

Furthermore, the present invention relates to the use of an aluminum-containing and/or aluminum-alloyed hot-dip galvanizing layer for producing blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2: 2016-12 and/or DIN 4102-2:1977-09, preferentially for generating (producing) a blaze-resistant and/or fire-resistant steel component, especially a blaze-resistant and/or fire-resistant steel component in accordance with DIN EN 13501-2:2016-12 and/or DIN 4102-2:1977-09.

Moreover, the subject-matter of the present invention is also the use of hot-dip galvanizing and/or a hot-dip galvanizing method, respectively, for producing blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2:2016-12 and/or DIN 4102-2:1977-09, especially for generating (producing) a blaze-resistant and/or fire-resistant steel component, preferentially a blaze-resistant and/or fire-resistant steel component in accordance with DIN EN 13501-2:2016-12 and/or DIN 4102-2:1977-09.

Similarly, the present invention relates to the use of aluminum to increase and/or improve the blaze resistance and/or the fire resistance, especially the blaze resistance and/or the fire resistance in accordance with DIN EN 13501-2:2016-12 and/or DIN 4102-2:1977-09, of a hot-dip galvanized steel component and/or a steel component provided with a hot-dip galvanizing layer.

Furthermore, the subject-matter of the present invention is also the use of a steel component provided with an aluminum-containing and/or aluminum-alloyed hot-dip galvanizing layer as a structural design component for compliance with the requirements of blaze resistance and/or fire resistance, especially blaze resistance and/or fire resistance in accordance with DIN EN 13501-2:2016-12 and/or DIN 4102-2:1977-09.

Furthermore, the present invention relates to the use of a steel component provided with an aluminum-containing and/or aluminum-alloyed hot-dip galvanizing layer as a structural component of receiving devices, especially enclosures or containers, for energy storage devices or energy converters, such as fuel cells, accumulators, batteries, galvanic elements or the like, especially for the automotive sector, preferentially to meet the requirements of blaze resistance and/or fire resistance.

Furthermore, the present invention relates to a supporting structure, especially a steel supporting structure, for a building, especially for a building or part of a building, wherein the supporting structure comprises, as structural design components, a plurality of steel components provided with an aluminum-containing and/or aluminum-alloyed hot-dip galvanizing layer in order to meet the requirements of blaze resistance and/or fire resistance, and to a construction, especially a building or part of a building, comprising the supporting structure according to the invention.

Finally, the present invention also relates to the use of an aluminum-containing and/or aluminum-alloyed hot-dip galvanizing layer for providing blaze resistance and/or fire resistance to iron-based or iron-containing, especially steel-based or steel-containing, articles and/or for providing iron-based or iron-containing, especially steel-based or steel-containing, articles with blaze resistance and/or fire resistance.

Fire protection in general is especially understood as all measures that prevent the development and spread of a fire (i.e. fire and smoke) (i.e. preventive fire protection or fire prevention) and enable the rescue of people and animals as well as effective extinguishing of a fire (i.e. defensive fire protection). Fire protection is multi-layered as well as complex and is therefore found in many areas of daily life. Therefore, in Germany, for example, requirements for fire protection can be found in a large number of legal regulations, such as the fire department laws and building codes of the federal states as well as numerous other laws, ordinances and guidelines.

As explained above, a distinction is generally made especially between preventive fire protection on the one hand and defensive fire protection on the other. Preventive fire protection is especially the term for all measures that are taken preventively in order to counteract the development and spread of fires by means of structural, technical and organizational measures and to limit the effects of fires as far as possible. Consequently, preventive fire protection is divided into structural fire protection, plant fire protection and organizational fire protection.

In terms of building regulations, preventive fire protection serves to protect life and limb, the environment and public safety and is required as a prerequisite for effective fire-fighting. The public-law provisions of the state building codes are enacted in Germany as minimum requirements. In addition to the building code, the requirements relating to property protection are based on agreements under private law; the requirements imposed by the respective property insurer on the design of the building or its technical systems are often decisive here.

Preventive structural fire protection is therefore a very complex field of work, wherein the solutions for meeting the protection goals, such as fire prevention, prevention of fire spread, rescue and effective firefighting etc., lead to a wide variety of solutions, each of which must be approved by the responsible building inspectorate. Aspects that can influence fire protection solutions are, for example, the construction method (e.g. position of the buildings on the site and in relation to one another), the type of construction (e.g. structural condition, such as solid, skeleton, truss, assembly construction etc.), the selection of building materials, the location of the building (e.g. accessibility), the type and number of occupants, the dimensions (e.g. size, configuration and subdivision of buildings), the type and quantity of fire loads and hazardous materials (e.g. risk of fire and damage spread), the hazards of fire and/or damage (e.g. ignition sources, conditions and probabilities), the type of use (e.g. operational as well as use-related) and the type of building (e.g. operational and usage procedures), fire detection (e.g. probability of detection and notification), the start of rescue and firefighting operations, the extent and duration of rescue and firefighting operations, the capabilities of emergency response personnel (e.g. firefighters, rescue services, firefighting resources and other emergency response personnel, fire department, rescue service, provision of extinguishing agents, etc.), the availability of technical equipment (e.g. extinguishing systems, fire alarm systems, smoke and heat extraction systems, hazard detection systems), the scope of operational hazard prevention measures (e.g. fire protection regulations, hazard prevention plans, training courses, instructions, plant fire departments, firefighting aids etc.).

The essential objects and protective goals of preventive fire protection are to protect life, health, property, possessions and the environment.

In the context of structural fire protection, the structural measures are very diverse and include, among other things, the building materials and components used, regulated in Europe and Germany, for example, in DIN EN 13501 and DIN EN 1992-1-2 for reinforced concrete construction, DIN EN 1993-1-2 for steel construction and DIN EN 1995-1-2 for timber construction, as well as structural fire protection in industrial buildings (regulated in DIN 18230), but also escape route planning and the provision of extinguishing systems in buildings. The structural measures must above all consider the fire behavior of building materials and the fire resistance of building components.

Fire protection is of particular importance in the case of steel construction, wherein in the context of the present invention the term "steel construction" is to be understood broadly and includes not only pure steel construction but also composite steel construction, in which steel elements are connected with concrete, steel skeleton construction and steel building construction.

Steel construction is thus a technical field of structural engineering in which steel is primarily used for the construction of load-bearing structures. In pure steel construction, especially rolled steel girders, sheets and pipes made of structural steel are joined together to form a structure, for example by bolting, welding or riveting. As explained above, steel construction also includes—in addition to pure steel construction-composite steel construction, in which steel elements are used in combination with concrete, steel skeleton construction and steel building construction. Steel structures are generally designed in accordance with Eurocode 3: Design of Steel Structures (EN 1993). Steel construction combines the advantage of a comparatively short planning and construction time with a flexible execution of the structure, whereby this flexibility results, for example, from the use of relatively light and slender but highly loadable components and a high as well as precise degree of prefabrication and thus shortened assembly times.

However, steel components exposed to weathering must be protected against corrosion, for example by special surface coatings or the like.

Steel structures and steel (structural) parts are also often exposed to elevated temperatures in various situations and applications. This load may be present on a scheduled basis, either permanently or cyclically, e.g. in the area of thermoprocessing plants, or it may only occur in exceptional situations, e.g. in the event of a fire in a building. For components subjected to scheduled thermal loads, a high-temperature steel is generally used, the strength of which is reduced to a lesser extent by an existing temperature compared with a non-high-temperature steel; however, such high-temperature steel is completely unsuitable for structural applications in the building industry. If the thermal load represents an exceptional, i.e. non-scheduled, load case, it is not advisable to adapt the steel grade for economic reasons; instead, an attempt is made to protect the components from supercritical thermal loading by means of additional protective measures. The measures required for this usually provide for passive protection systems, such as coatings, cladding or the like. However, these measures are associated with considerable costs, including both the pure application of the coating and the necessary measures to ensure the durability of the coatings, claddings or the like, e.g. both the repairs that can occur as a result of damage during assembly and/or in the course of structural or usage-related measures, and the continuous maintenance.

According to the current state of the art, passive fire protection coatings are especially used in structural steel engineering to protect the steel structure against a fire; such coatings are applied to the steel components. Their function is based on the fact that they contain substances that foam or intumesce under thermal load in the event of a fire and thus achieve an insulating effect, i.e. heating of the steel component is prevented for a defined period of time. A disadvantage of these coatings, however, is that their effectiveness is only permitted for a limited period (especially a maximum of 10 years), making regular renewal necessary, which is especially time-consuming and cost-intensive. In addition, fire protection coatings are susceptible to mechanical stresses and must be protected accordingly from these or, if this is not possible or desired, examined for possible damage during potential events. From a sustainability point of view, in addition to the limited durability, the lack of circularity of the materials used must be named as a disadvantage.

The required fire protection of steel components is therefore usually ensured by passive measures, especially by fire protection cladding or fire protection coatings.

However, steel structures especially often require special fire protection because the relatively thin-walled cross-sections of steel components (e.g. beams) and their good thermal conductivity cause them to heat up rapidly in a fire. Since the mechanical properties of steel are strongly temperature-dependent, the yield strength of steel at 600° C., for example, decreases by half of the value at 20° C. as a result of this heating and the modulus of elasticity (Young's modulus) also decreases with increasing steel temperature. Depending on the fire load and the intended use of the structure, the functionality of the structure (load-bearing capacity) can be ensured for a specified minimum period and premature failure of the structure prevented by overdimensioning the steel components to match the required fire resistance period and/or by using special fire protection sheathing or fire protection coatings.

For fire protection, a fire resistance duration required by the legislator for the respective structure must be adhered to, which is defined for common buildings in each case in the state building codes of the federal states. This required fire resistance duration is divided into categories depending on the structure and its use, for example, according to the German standard (DIN 4102: Fire Behavior of Building Materials and Components, especially DIN 4102-2:1977-09) into the categories F30, F60, F90, F120 or F180, wherein these numbers define the minimum duration (specified in minutes) that the structure must withstand the fire. The standard fire to be assumed for oversizing the component and/or for determining the insulating fire protection measures is the unit temperature/time curve (also called ETK for short), which describes a temperature/time curve according to which the gas temperature rises steeply to over 600° C. within the first few minutes and then continues to rise slowly but steadily. In this way, all additional measures to protect a steel component demonstrate their performance profile. The oversizing methodology (according to the European standard EN 1993-1-2 or DIN EN 13501-2:2016-12), on the other hand, is based on a computational determination, wherein the starting point is the computational determination of the steel temperature in an "ETK fire" and the determination of the steel temperature allows the mechanical properties required for the design to be determined, with the actual design taking place in a similar way to cold design with the heat-affected mechanical properties under safety coefficients adapted to the fire (wherein this design procedure is calibrated on the basis of tests). In hot design, on the other hand, no fire protection is applied or attached, but rather the component is overdimensioned, i.e. the component is designed stronger than would be required for cold design. The resulting larger component dimensions (i.e. component mass) result in slower heating of the component under fire load, which in turn correlates with a smaller reduction in steel strength and correspondingly higher load-bearing capacity.

For the fire protection of pure steel components, oversizing is often excessive and therefore not feasible or at least not economical; consequently, additional passive and/or active fire protection measures must generally be provided. Fire protection measures retrofitted to the steel component generally have an insulating, shielding and/or heat dissipating effect. Insulating, shielding and/or heat dissipating fire protection measures are, for example, sheathing or cladding made of cementitious sprayed plasters such as with vermiculites or mineral fibers (usually together with a necessary plaster base), box-shaped sheathing e.g. made of gypsum board, insulating layer-forming coatings, room-closing systems such as suspended ceilings, filling of steel section cavities with pump-independent and thermally freely circulating water, etc. However, these required fire protection measures are time-consuming and costly to install and require the application of further or additional materials and raw materials. This is disadvantageous in terms of economic, technical and safety factors, but also in terms of aesthetic aspects. It is also detrimental in terms of sustainability.

BRIEF SUMMARY OF THE INVENTION

The problem underlying the present invention is therefore to provide the required fire protection (i.e. blaze resistance and/or fire resistance) for steel components in a simplified manner, wherein the disadvantages of the prior art described above are to be at least largely avoided or at least mitigated.

Especially a method for generating (producing) blaze resistance and/or fire resistance on steel components or for providing (equipping) steel components with blaze resistance and/or fire resistance is to be provided, with which blaze resistant and/or fire resistant steel components can be generated (produced) in a simplified and cost-efficient way compared to conventional constructive fire protection measures of the state of the art, which can be realized reliably from a technical point of view.

Especially, the aspects of reproducibility in terms of planning and execution, process economy and operational compatibility as well as sustainability including improved cost and resource utilization are also to be enabled within the scope of the present invention.

To solve the problem described above, the present invention proposes-according to a first aspect of the present invention-a method for generating (producing) blaze resistance and/or fire resistance on or onto a steel component and/or for providing (equipping) a steel component with blaze resistance and/or fire resistance is provided; further, especially special and/or advantageous embodiments of the method according to the invention.

Furthermore, the present invention relates-according to a second aspect of the present invention—to the use of an aluminum-containing and/or aluminum-alloyed hot-dip galvanizing layer for generating (producing) blaze resistance and/or fire resistance, especially special and/or advantageous embodiments of the use according to the invention.

Furthermore, the present invention relates-according to a third aspect of the present invention—to the use of hot-dip galvanizing and/or of a hot-dip galvanizing method for producing blaze resistance and/or fire resistance on or onto a steel component and/or for providing (equipping) a steel component with blaze resistance and/or fire resistance, especially special and/or advantageous embodiments of the use of the invention.

Furthermore, the present invention relates-according to a fourth aspect of the present invention—to the use of aluminum for increasing and/or improving the blaze resistance and/or the fire resistance of a hot-dip galvanized steel component and/or a steel component provided with a hot-dip galvanizing layer, especially special and/or advantageous embodiments of the use according to the invention.

Similarly, the present invention relates-according to a fifth aspect of the present invention—to the use of a steel component provided with an aluminum-containing and/or aluminum-alloyed hot-dip galvanizing as a structural component for complying with the requirements of blaze resistance and/or fire resistance, especially special and/or advantageous embodiments of the use according to the invention.

Moreover, the subject-matter of the present invention—according to a sixth aspect of the present invention—is the use of a steel component provided with an aluminum-containing and/or aluminum-alloyed hot-dip galvanizing layer as a structural component of receiving devices, especially enclosures or containers, for energy stores or energy converters, such as fuel cells, accumulators, batteries, galvanic elements or the like, especially for the automotive sector, preferentially to meet the requirements of blaze resistance and/or fire resistance, especially special and/or advantageous embodiments of the use according to the invention.

Similarly, the present invention relates-according to a seventh aspect of the present invention—to a supporting structure, especially a steel structure, for a construction, especially for a building or part of a building, especially particular and/or advantageous embodiments of the supporting structure according to the invention.

Furthermore, the present invention relates—in accordance with an eighth aspect of the present invention—to a construction, especially building or part of a building, comprising the inventive supporting structure, especially special and/or advantageous embodiments of the structure according to the invention.

Finally, the subject-matter of the present invention—according to a ninth aspect of the present invention—is the use of an aluminum-containing and/or aluminum-alloyed hot-dip galvanizing layer for producing blaze resistance and/or fire resistance on iron-based or iron-containing, especially steel-based or steel-containing, articles and/or for providing (equipping) iron-based or iron-containing, especially steel-based or steel-containing, articles with blaze resistance and/or fire resistance, especially special and/or advantageous embodiments of the structure according to the invention.

It is self-evident from the following explanations that designs, embodiments, advantages and the like, which are set out below for the purpose of avoiding repetition in respect of only one aspect of the invention, naturally also apply accordingly in respect of the other aspects of the invention, without this requiring separate mention.

In the case of all relative or percentage weight-related data mentioned below, especially relative quantity or weight data, it should furthermore be noted that these are to be selected by the skilled person within the scope of the present invention in such a way that they always add up or add up to 100% or 100 wt % in total, taking into account all components or ingredients, especially as defined below; however, this is self-evident for the skilled person.

In all other respects, the person skilled in the art may—depending on the application or individual case-deviate from the range specifications given below, if necessary, without departing from the scope of the present invention.

In addition, it applies that all values or parameters or the like mentioned in the following can basically be determined with standardized or explicitly stated determination methods or otherwise with determination or measurement methods familiar to the skilled person in this field.

Having said this, the present invention will now be explained in detail below.

DETAILED DESCRIPTION OF THE INVENTION

Figure 1:
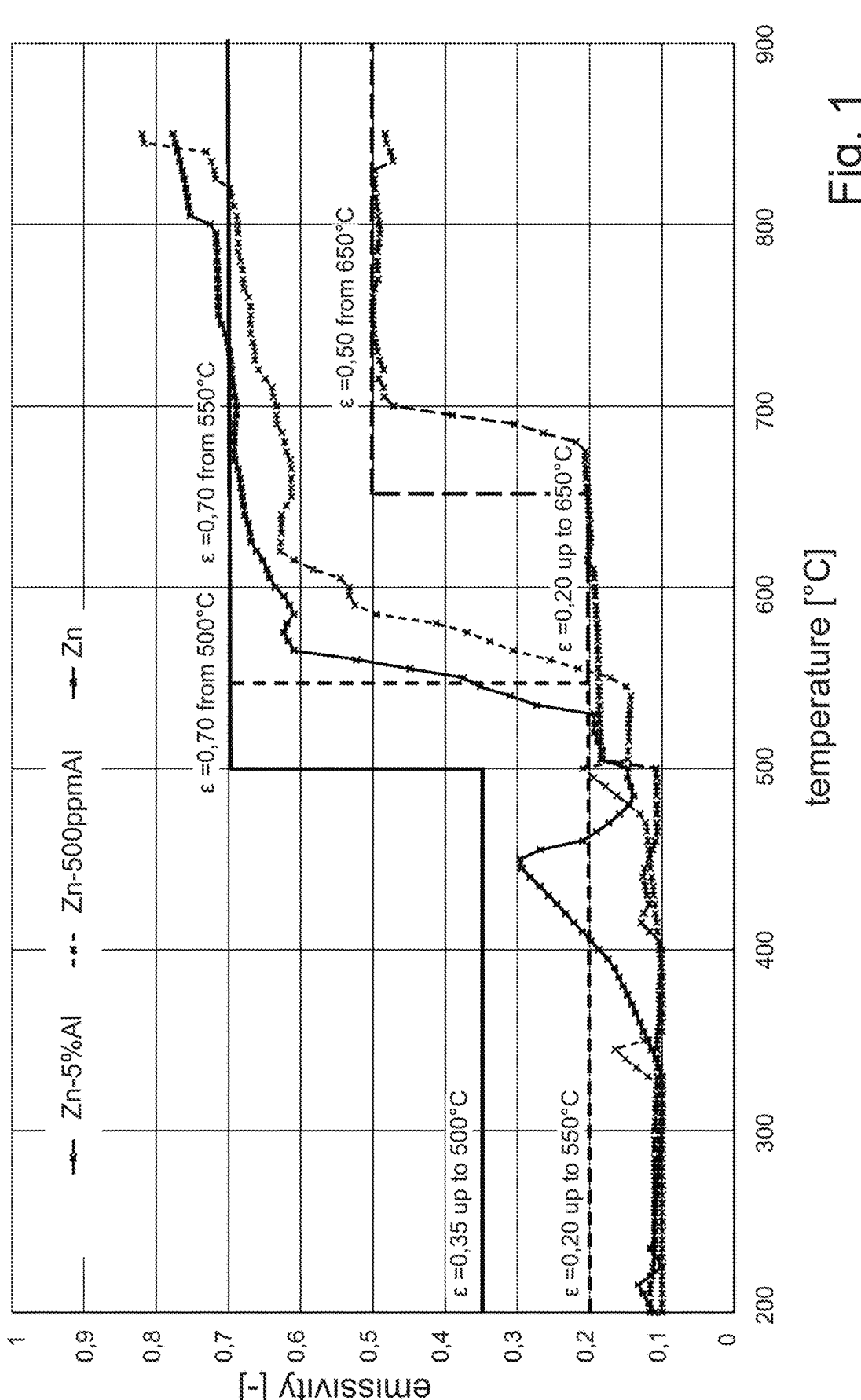
FIG. 1 provides a diagram illustrating the behavior of the emissivity (emission degree) $\varepsilon_m$ of the surface of various steel construction parts (each low-silicon steel, Si content <0.03%) at increasing temperature as a function of the aluminum content in the coating (pure zinc hot-dip galvanized coating with 0% Al as comparison and/or reference, Al-alloyed hot-dip galvanized coating with 500 ppm Al according to the invention and Al-alloyed hot-dip galvanized coating with 5 wt. % Al according to the invention), wherein the emissivity value is significantly reduced with increasing Al-content.

Thus, subject-matter of the present invention—according to a first aspect of the present invention—is a method for generating (producing) blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2: 2016-12 and/or DIN 4102-2:1977-09, especially a method for generating (producing) a blaze-resistant and/or fire-resistant steel component, especially a blaze-resistant and/or fire-resistant steel component in accordance with DIN EN 13501-2:2016-12 and/or DIN 4102-2:1977-09, wherein the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, especially in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures above 500° C., especially at temperatures above 550° C., preferentially at temperatures above 600° C., more preferably in the temperature range of from 500° C. to 850° C., even more preferably in the temperature range of from 500° C. to 800° C., an emissivity (emission degree) of the surface $\varepsilon_m$ below 0.7, especially of at most 0.65, preferentially of at most 0.60, more preferably of at most 0.55, even more preferably of at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath at has, at temperatures in the range of from 500° C. to 850° C., preferably at temperatures in the range of from 500° C. to 800° C., an emissivity (emission degree) of the surface $\varepsilon_m$ below 0.7, especially in the range of from 0.05 to <0.7, preferentially in the range of from 0.05 to 0.65, more preferably in the range of from 0.05 to 0.60, even more preferably in the range of from 0.05 to 0.55.

For, as the applicant has now found out completely surprisingly, the blaze resistance and/or the fire resistance (especially blaze resistance and/or fire resistance in accordance with DIN EN 13501-2:2016-12 and/or DIN 4102-2: 1977-09) of steel components can be achieved in an efficient way by providing (equipping) the steel components concerned with an aluminum-containing and/or aluminum-alloyed hot-dip galvanizing layer. In a completely unexpected way, such aluminum-containing and/or aluminum-alloyed hot-dip galvanizing layer significantly reduces and slows down the heating of the component in the event of a fire (and this without additional constructive and costly fire protection measures as described at the beginning in connection with the state of the art).

It is particularly surprising that the blaze resistance or fire resistance, respectively, of such steel components, which are provided with an aluminum-containing and/or aluminum-alloyed hot-dip galvanizing layer, not only exhibit a significantly improved or increased blaze resistance or fire resistance, respectively, compared to ungalvanized steel components, but also compared to conventionally galvanized steel components (i.e. steel components which are provided with a conventional galvanizing layer of pure zinc, i.e. without aluminum content). The term pure zinc is used in the context of the present invention to designate zinc melts or hot-dip galvanizing layers produced therefrom which consist of pure or quasi-pure zinc (i.e. which are provided without relevant aluminum content or are at least substantially free, preferentially (completely) free of aluminum.

Such a significant increase or improvement in the blaze resistance or fire resistance, respectively, of the steel components provided with the aluminum-containing and/or aluminum-alloyed hot-dip galvanizing layer in accordance with the present invention was not foreseeable for the person skilled in the art and must therefore be regarded as completely surprising.

Without wanting to commit to a specific theory, the surprisingly found generation (production) of blaze resistance and/or fire resistance on or onto steel components as a result of the aluminum-containing and/or aluminum-alloyed hot-dip galvanizing layer can possibly be explained by the fact that in the case of blaze or fire, especially due to diffusion, a transformation of Zn/Al-phases into Fe/Al-phases takes place, which have a reduced emissivity compared to zinc and/or Fe/Zn-phases, and/or that temperature-resistant aluminum oxides are formed in the hot-dip galvanizing layer in the event of fire, whereby the surface of the steel component coated with such an aluminum-containing and/or aluminum-alloyed hot-dip galvanizing layer is efficiently shielded from the fire or from the high temperatures, so that a significantly weakened and/or delayed heating of the component occurs.

As the applicant has equally surprisingly found out, the fire resistance can be significantly increased or improved due to the presence of aluminum not only compared to ungalvanized steel components, but also compared to conventionally galvanized steel components with a hot-dip galvanizing layer based on pure zinc, as will be explained in detail below. In addition, the aluminum content of the hot-dip galvanized coating allows significantly lower coating thicknesses to be realized compared with conventionally galvanized steel components (accompanied by significant savings in resources and weight).

In addition, the aluminum-containing and/or aluminum-alloyed hot-dip galvanizing layer also ensures efficient corrosion protection, which is also improved compared to conventionally galvanized steel components (especially simultaneously with a lower thickness of the hot-dip galvanizing layer).

The inventive concept makes it possible to produce and/or effect fire resistance and/or blaze resistance of steel components to such an extent that no further additional structural fire protection measures are required, such as those mentioned and described at the beginning in connection with the description of the prior art as being disadvantageous (such as fire protection coatings, fire protection cladding, etc.).

The present solution approach of the invention is based in particular significantly on the use of aluminum-alloyed zinc melts especially for piece galvanizing of structural elements made of steel for the purpose of fire protection and/or combined corrosion and fire protection of the same. Especially from a content of 250 ppm and/or 500 ppm aluminum in the zinc melt (and consequently also in the resulting hot-dip galvanizing layers), zinc coatings are formed which behave significantly more favorably than aluminum-free zinc coatings under the action of thermal loads, as typically occur in the case of fire.

Especially, the new inventive solution approach achieves a large number of advantages and special features, some of which have already been mentioned hereinabove.

In a non-limiting manner, reference should also be made to the following advantages and special features of the present invention, which—in addition to the advantages of conventional galvanized components already described hereinabove-represent a significant improvement over the prior art:

With increasing Al content in the zinc melt (and thus in the zinc coating), the emissivity $\varepsilon$, which is a measure of the ratio of absorbed to reflected thermal radiation (with $\varepsilon=0$=complete reflection and $\varepsilon=1$=complete absorption), remains at a low level up to higher temperatures, slowing down the heating of the component galvanized in this way compared with a component galvanized in an Al-free and/or quasi-Al-free zinc melt.

The level of emissivity increase at the onset of temperature-induced diffusion methods under fire load is also lower when Al-alloyed zinc melts are used (again, compared to a component galvanized in an Al-free and/or quasi Al-free zinc melt), which also slows down the heating of the component.

The reduction in emissivity achieved in accordance with the inventive method thus results in a lower component temperature after a defined period of fire compared with a component galvanized in an Al-free and/or quasi Al-free zinc melt, which is associated with a higher load-bearing capacity. Alternatively, the same component temperature, i.e. the same load-bearing capacity, can be achieved by reducing the cross-section of the steel profile, which in turn results in a significant saving in the necessary steel mass.

The use of Al-alloyed zinc melts also leads to a reduction in zinc coating thickness, especially from contents of 1,200 ppm Al in the zinc melt, but also below this value. As a result, significantly thinner zinc coatings can be applied for applications in which no or only low corrosion requirements are placed on the steel structures, such as in the case of a corrosivity category C1 or C2 in accordance with DIN EN ISO 12944, which also increases material and component efficiency.

The use of Al-alloyed zinc melts leads, especially from contents >1,200 ppm Al in the zinc melt (but also already below this value), also to the fact that the appearance of the zinc coating becomes increasingly independent of the steel chemistry. From an Al content of approx. 1,200 ppm, all steels in categories A to D in accordance with DIN EN ISO 14713-2 can thus be used. The previous limitation in the prior art to categories A and B, which is required to achieve reduced emissivity up to 500° C. according to the prior art, no longer exists in the context of the present invention.

The use of thin-layer, especially transparent post-treatment coatings, e.g. a passivation and/or a sealing, preferentially with a layer thickness in the range of a few nanometers to a few micrometers, is possible in the same way within the scope of the present invention and is even advantageous with respect to the result to be achieved.

The present invention thus provides—as described above—a method for generating (producing) blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2:2016-12 and/or DIN 4102-2:1977-09, especially a method for generating (producing) a blaze-resistant and/or fire-resistant steel component, especially a blaze-resistant and/or fire-resistant steel component in accordance with DIN EN 13501-2:2016-12 and/or DIN 4102-2:1977-09, wherein the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, especially in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures above 500° C., especially at temperatures above 550° C., preferentially at temperatures above 600° C., more preferably in the temperature range of from 500° C. to 850° C., even more preferably in the temperature range of from 500° C. to 800° C., an emissivity (emission degree) of the surface $\varepsilon_m$ below 0.7, especially of at most 0.65, preferentially of at most 0.60, more preferably of at most 0.55, even more preferably of at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath at has, at temperatures in the range of from 500° C. to 850° C., preferably at temperatures in the range of from 500° C. to 800° C., an emissivity (emission degree) of the surface $\varepsilon_m$ below 0.7, especially in the range of from 0.05 to <0.7, preferentially in the range of from 0.05 to 0.65, more preferably in the range of from 0.05 to 0.60, even more preferably in the range of from 0.05 to 0.55.

The terms blaze resistance and fire resistance as used in the context of the present invention are to be understood especially as synonyms and are used in accordance with the relevant standard regulations and standards, especially DIN EN 13501-2:2016-12 and DIN 4102-2:1977-09 (but also other relevant standards and standard regulations, such as e.g. DIN EN 1993-1-2:2006-10 and DIN EN 1991-1-2/NA: 2015-09).

The so-called emissivity (emission degree) of the surface $\varepsilon_m$ can therefore be used as a measure of the heating of the steel component in the event of fire and/or blaze.

In the context of the present invention, the emissivity (emission degree) of the surface $\varepsilon_m$ denotes the emissivity of the surface $\varepsilon_m$ in accordance with DIN EN 1993-1-2:2006-10.

The emission degree (also synonymously referred to as emissivity) of a body indicates how much radiation the body emits compared to an ideal heat emitter (i.e. a black body); consequently, the value for emissivity is always between zero (no absorption) and one (100% absorption). Emissivity is thus a measure of how strongly a material or body (e.g. a steel component in the case of the present invention) exchanges thermal radiation with its surroundings.

The emissivity or emission degree, respectively, s is a dimensionless physical quantity, which thus provides a measure of how strongly a material and/or its surface emits thermal radiation to its environment; because the relevant Eurocodes are based on Kirchhoff's law, which states that a good radiator is also a good absorber, and which is thus based on the approximation that the absorption coefficient $\alpha$ corresponds to the emissivity s of a body. The emissivity of real objects and more specifically of metallic surfaces, such as steel components in the case of the present invention, depends on many different parameters, such as surface condition, component temperature, wavelength range and radiation angle, and is consequently a highly variable physical quantity. Since the parameter of emissivity $\varepsilon$ combines these influencing variables in a single parameter, this parameter is particularly suitable in the case of the present invention for characterizing the blaze resistance or fire resistance, respectively, of steel components designed according to the invention.

The parameter of emissivity (emission degree) of the surface $\varepsilon_m$, as used in accordance with the inventive, is used in accordance with the aforementioned relevant standard DIN EN 1993-1-2:2006-10.

In accordance with DIN EN 1993-1-2:2006-10, the emissivity of an ungalvanized structural steel surface is to be assumed to be 0.70. In comparison, for conventionally galvanized structural steel (i.e. structural steel which is provided with a hot-dip galvanizing layer of pure zinc), an emissivity (emission degree) of the surface $\varepsilon_m$ of about 0.35 is to be assumed at temperatures of up to 500° C., but at temperatures of 500° C. and above, an emissivity (emission degree) of the surface $\varepsilon_m$ of 0.70 and more (i.e. the same as for ungalvanized structural steel) (cf. also the second draft of the project team SC3.T6 of the standardization body CEN/TC 250/SC 3/WG 2 N 82 for updating EN 1993-1-2 from 2019).

In a completely surprising manner, it was found in the context of the present invention that as a result of the incorporation of aluminum into the hot-dip galvanizing layer and/or as a result of the alloying with aluminum in relation to the hot-dip galvanizing layer, the emissivity (emission degree) of the surface $\varepsilon_m$ can be significantly lowered below 0.70 even at temperatures above 500° C. (which means that in the event of fire and/or blaze, the steel component in question exhibits significantly reduced and delayed heating; cf. also the above explanations).

In accordance with the invention, the wording means that there is an emissivity (emission degree) of the surface $\varepsilon_m$ below 0.7, i.e. $\varepsilon_m<0.7$, thus excluding the value of 0.7 itself (hence the wording "below").

The temperature-dependent parameter of the emissivity (emission degree) $\varepsilon_m$ of steel surfaces can be determined experimentally by routine methods and measuring procedures known per se to the skilled person (especially using heat sensors, especially infrared sensors, and/or thermocouples). In the context of the invention, the determination according to the so-called emissivity performance test, as described in detail in: C. Gaigl and M. Mensinger, Technical Report "*Thermal impact on HDG construction*", Technical University of Munich, February 2018, and M. Mensinger and C. Gaigl, paper "*Feuerwiderstand verzinkter Stahlkonstruktionen*", Stahlbau, Vol. 88, pages 3 to 10, January 2019, has proven particularly useful in this context. This determination method for the emissivity (emission degree) of the surface $\varepsilon_m$ is also used in the context of the present invention, especially also in the context of the embodiments according to the invention. This determination method is based especially on the experimental recording of the temperature curve of the steel component in the event of fire and/or blaze (e.g. in accordance with DIN EN 1993-1-2: 2006-10), wherein the relevant steel component or the relevant test specimen, respectively, is subjected to continuous or increasing thermal loading. The emissivity can then be determined and/or calculated from this using Planck's radiation law.

For the assessment of interior steel structures, the so-called uniform temperature-time curve (ETK) is generally available as a thermal exposure. Depending on the existing building regulations, however, natural fire models can also be used. In accordance with DIN EN 1991-1-2, the ETK is defined as thermal stress and/or load as follows:

$$T = 345 \, \log_{10}(8t + 1] + 20 \, [^\circ \text{C.}]$$

with:

T=combustion chamber temperature [° C.]; t=time [min].

Irrespective of the thermal effect, heat transport in the event of a fire takes place by means of energy exchange between several systems. In this method, thermal energy is always transported from the higher to the lower energy level. If components are not in direct contact, this can occur by two different mechanisms, namely convection and/or electromagnetic radiation. The temperature increase $\Delta\theta_{a,t}$ of an unprotected steel component can be calculated during a time interval $\Delta t < 5$ [sec] according to the following equation from (1):

$$\Delta\theta_{a,t} = k_{sh} \cdot \frac{A_m / V}{c_a \cdot p_a} \cdot \dot{h}_{net} \cdot \Delta t \tag{1}$$

In addition to factors such as the correction factor for shading effects $k_{sh}$, the profile factor $A_m/V$, the specific heat capacity $c_a$ and the bulk density of steel $p_a$, the net heat flux $\dot{h}_{net}$ is reflected in the component heating. The latter is composed of the two parts of convection $\dot{h}_{net,c}$ and radiation $\dot{h}_{net,r}$ mentioned above, cf. equations (2) to (4) below:

$$\dot{h}_{net} = \dot{h}_{net,c} + \dot{h}_{net,r} \tag{2}$$

$$\dot{h}_{net,c} = \alpha_c \cdot (\theta_g - \theta_a) \tag{3}$$

$$\dot{h}_{net,r} = \phi \cdot \varepsilon_m \cdot \varepsilon_f \cdot \sigma \cdot \left[ (\theta_g + 273)^4 - (\theta_a + 273)^4 \right] \tag{4}$$

As can be seen from formulas (2) to (4), thermal radiation makes a significantly larger contribution to the heating of the components, especially in the area of large temperature differences between the component and the environment. The heat transfer from radiation is significantly influenced by the surface of the components, so that it is precisely here that an effect due to hot-dip galvanizing occurs.

Both emissivities, i.e. both the emissivity of the component surface $\varepsilon_m$ and the emissivity of the combustion chamber $\varepsilon_f$, influence the radiation component of the heat flux. According to the assumption $\varepsilon_f = 1.0$ of the relevant Eurocodes (i.e. DIN EN 1993-1-2, Eurocode 3: Design of steel structures, Part 1-2: General rules, structural design for fire, and DIN EN 1994-1-2, Eurocode 4: Design of composite steel and concrete structures, Part 1-2: General rules, structural design for fire), the emissivity of the surroundings is assigned the properties of an ideal black body. For structural steel, on the other hand, an emissivity of $\varepsilon_m=0.70$ is assumed, irrespective of its actual surface properties; this corresponds to a heat absorption of 70% of the radiant energy introduced.

The use of an aluminum-containing and/or aluminum-alloyed hot-dip galvanizing layer on steel components according to the invention thus leads—as described above—to a significant reduction in the emissivity at the surface $\varepsilon_m$ in the event of fire and/or blaze, especially compared to corresponding ungalvanized steel components, but also compared to conventionally galvanized steel components (i.e. provided with a hot-dip galvanizing layer of pure zinc). In this way, within the scope of the present invention, fire protection requirements of the relevant standards and standard regulations, especially DIN EN 13501-2:2016-12 and/ or DIN 4102-2:1977-09, can be achieved even without additional and/or further constructive fire protection measures.

The aluminum-containing and/or aluminum-alloyed hot-dip galvanized coatings used in the present invention and their production and/or manufacture are sufficiently known to the skilled person from the prior art as such, so that no further explanations are required in this respect. So far, however, such aluminum-containing and/or aluminum-alloyed hot-dip galvanized coatings have been provided in the prior art only for corrosion protection, i.e. an influence with regard to the improvement of the blaze resistance and/or the fire resistance has not been recognized in the prior art so far and consequently has not been realized. This knowledge and technical teaching comes—in a completely surprising way—only from the applicant of the present invention.

As a result, the present invention is based on the surprising finding of the applicant that blaze resistance and/or fire resistance, especially blaze resistance and/or fire resistance in accordance with DIN EN 13501-2:2016-12 and/or DIN 4102-2:1977-09, can be generated (produced) on or onto a steel component and/or a steel component can be equipped (provided) with blaze resistance and/or fire resistance, especially blaze resistance and/or fire resistance in accordance with DIN EN 13501-2:2016-12 and/or DIN 4102-2:1977-09, by equipping (providing) the steel component with an aluminum-containing and/or aluminum-alloyed hot-dip galvanizing layer and/or by subjecting the steel component to hot-dip galvanizing using an aluminum-containing and/or aluminum-alloyed zinc melt, especially in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures above 500° C., especially at temperatures above 550° C., preferentially at temperatures above 600° C., more preferably in the temperature range of from 500° C. to 850° C., even more preferably in the temperature range of from 500° C. to 800° C., an emissivity (emission degree) of the surface $\varepsilon_m$ below 0.7, especially of at most 0.65, preferentially of at most 0.60, more preferably of at most 0.55, even more preferably of at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath at has, at temperatures in the range of from 500° C. to 850° C., preferably at temperatures in the range of from 500° C. to 800° C., an emissivity (emission degree) of the surface $\varepsilon_m$ below 0.7, especially in the range of from 0.05 to <0.7, preferentially in the range of from 0.05 to 0.65, more preferably in the range of from 0.05 to 0.60, even more preferably in the range of from 0.05 to 0.55.

In order to achieve the desired effect of blaze resistance and/or fire resistance according to the invention, certain minimum thicknesses of the aluminum-containing and/or aluminum-alloyed hot-dip galvanizing layer should be provided; on the other hand, for reasons of sustainability, material savings and especially the weight of the steel component, the layer thickness should not exceed a certain upper limit.

In this context, it has proved useful within the scope of the present invention to apply the aluminum-containing and/or aluminum-alloyed hot-dip galvanizing layer, respectively, to the steel component with a layer thickness in the range of from 1 μm to 250 μm, especially in the range of from 1 μm to 200 μm, preferentially in the range of from 1.5 μm to 150 μm, preferably in the range of from 2 μm to 100 μm, more preferably in the range of from 2 μm to 80 μm, even more preferably in the range of from 2.5 μm to 70 μm, still more preferably in the range of from 2.5 μm to 60 μm, further preferably in the range of from 3 μm to 50 μm, even further preferably in the range of from 3.5 μm to 30 μm, most preferably in the range of from 4 μm to 25 μm.

Especially, it is advantageous according to the inventive method that the aluminum-containing and/or aluminum-alloyed hot-dip galvanizing layer is applied to the steel component with a layer thickness of at least 1 μm, especially of at least 1.5 μm, preferentially of at least 2 μm, preferably of at least 2.5 μm, more preferably of at least 3 μm, even more preferably of at least 3.5 μm, still more preferably of at least 4 μm.

Similarly, according to the inventive method, it is advantageous that the aluminum-containing and/or aluminum-alloyed hot-dip galvanizing layer is applied to the steel component with a layer thickness of up to 250 μm, especially of up to 200 μm, preferentially of up to 150 μm, preferably of up to 100 μm, more preferably of up to 80 μm, even more preferably of up to 70 μm, still more preferably of up to 60 μm, further preferably of up to 50 μm, even further of up to 30 μm, most preferably of up to 25 μm.

With the above coating thicknesses, particularly good results can be achieved in accordance with the inventive method. Nevertheless, it is not impossible to deviate from the above values and value ranges, especially on a case-by-case basis, without leaving the scope of the present invention; this is at the discretion of the person skilled in the art.

Similarly, the amount of aluminum and/or the aluminum content of the aluminum-containing and/or aluminum-alloyed hot-dip galvanizing layer used in accordance with the invention should vary in certain ranges in order, on the one hand, to ensure sufficient blaze resistance and/or fire resistance and, on the other hand, to take into account and/or comply with aspects of material weight, material economy and sustainability.

In this context, it has proved especially useful in accordance with the inventive method for the aluminum-containing and/or aluminum-alloyed hot-dip galvanizing layer to have an aluminum content, based on the aluminum-containing and/or aluminum-alloyed hot-dip galvanizing layer, and/or the aluminum-containing and/or aluminum-alloyed zinc melt (used to produce the aluminum-containing and/or aluminum-alloyed hot-dip galvanizing layer), respectively, to have an aluminum content, based on the aluminum-containing and/or aluminum-alloyed zinc melt, in the range of from 0.025 wt. % to 50 wt %, especially in the range of from 0.04 wt. % to 45 wt. %, preferentially in the range of from 0.05 wt. % to 40 wt. %, preferably in the range of from 0.075 wt. % to 30 wt. %, more preferably in the range of from 0.1 wt % to 20 wt. %, even more preferably in the range of from 1.5 wt. % to 15 wt. %, still more preferably in the range of from 2 wt. % to 12.5 wt. %, further preferably in the range of from 3 wt. % to 10 wt. %, even further preferably in the range of from 3.5 wt. % to 9 wt. %, most preferably in the range of from 4 wt. % to 8 wt. %.

In this context, it is especially advantageous according to the inventive method that the aluminum-containing and/or aluminum-alloyed hot-dip galvanizing layer has an aluminum content, based on the aluminum-containing and/or aluminum-alloyed hot-dip galvanizing layer, and/or the aluminum-containing and/or aluminum-alloyed zinc melt (used to produce the aluminum-containing and/or aluminum-alloyed hot-dip galvanizing layer), respectively, has an aluminum content, based on the aluminum-containing and/or aluminum-alloyed zinc melt, of at least 0.025 wt. %, especially of at least 0.04 wt %, preferentially of at least 0.05 wt. %, preferably of at least 0.075 wt. %, more preferably of at least 0.1 wt. %, even more preferably of at least 1.5 wt. %, still more preferably of at least 2 wt. %, further preferably of at least 3 wt. %, even further preferably of at least 3.5 wt. %, most preferably of at least 4 wt. %.

Furthermore, it has proved especially useful in this context, within the scope of the present invention, that the aluminum-containing and/or aluminum-alloyed hot-dip galvanizing layer has an aluminum content, based on the aluminum-containing and/or aluminum-alloyed hot-dip galvanizing layer, and/or the aluminum-containing and/or aluminum-alloyed zinc melt (used to produce the aluminum-containing and/or aluminum-alloyed hot-dip galvanizing layer) layer), respectively, has an aluminum content, based on the aluminum-containing and/or aluminum-alloyed zinc melt, of up to 50 wt. %, especially of up to 45 wt. %, preferentially of up to 40 wt. %, preferably of up to 30 wt. %, more preferably of up to 20 wt. %, even more preferably of up to 15 wt. %, still more preferably of up to 12.5 wt %, further preferably of up to 10 wt. %, even further preferably of up to 9 wt. %, most preferably of up to 8 wt. %.

Furthermore, according to an alternative embodiment in this context, it has also proved particularly useful within the scope of the present invention that the aluminum-containing and/or aluminum-alloyed hot-dip galvanizing layer has an aluminum content, based on the aluminum-containing and/or aluminum-alloyed hot-dip galvanizing layer, has an aluminum content, based on the aluminum-containing and/or aluminum-alloyed zinc melt, in the range of from 0.5 wt. % to 20 wt. %, especially in the range of from 1 wt. % to 10%, and/or that the aluminum-containing and/or aluminum-alloyed zinc melt (used to produce the aluminum-containing and/or aluminum-alloyed hot-dip galvanizing layer) has an aluminum content, based on the aluminum-containing and/or aluminum-alloyed zinc melt, in the range of from 0.5 wt. % to 20 wt. %, especially in the range of from 1 wt. % to 10 wt. %, respectively.

With regard to the composition of the aluminum containing and/or aluminum-alloyed hot-dip galvanizing layer applied to the blaze-resistant and/or fire-resistant steel component in accordance with the inventive method and/or the aluminum-containing and/or aluminum-alloyed zinc melt (used to produce the aluminum-containing and/or aluminum-alloyed hot-dip galvanizing layer), this composition may vary in certain ranges, wherein certain specifications are given with regard to the overall composition of the aluminum-alloyed and/or aluminum containing hot-dip galvanizing layer and/or the aluminum-alloyed and/or aluminum-containing zinc melt due to the previously listed aluminum content.

Within the scope of the present invention, it has especially proved useful that the aluminum-containing and/or aluminum-alloyed hot-dip galvanizing layer and/or the aluminum-containing and/or aluminum-alloyed zinc melt (used to produce the aluminum-containing and/or aluminum-alloyed hot-dip galvanizing layer) has the following composition, wherein in the case of the aluminum-containing and/or aluminum-alloyed hot-dip galvanizing layer relate to the aluminum-containing and/or aluminum-alloyed hot-dip galvanizing layer and/or in the case of the aluminum-containing and/or aluminum-alloyed zinc melt (used to produce the aluminum-containing and/or aluminum-alloyed hot-dip galvanizing layer) relate to the aluminum-containing and/or aluminum-alloyed hot-dip galvanizing melt, respectively, and are to be selected in such a way that a total of 100 wt. % results:

(i) zinc (Zn) in amounts of from 50 wt % to 99.975 wt. %, especially in the range of from 55 wt. % to 99.96 wt. %, preferentially in the range of from 60 wt. % to 99.95 wt. %, preferably in the range of from 70 wt. % to 99.925 wt. %, more preferably in the range of from 80 wt. % to 99.1 wt. %, even more preferably in the range of from 85 wt. % to 98.5 wt. %, still more preferably in the range of from 87.5 wt. % to 98 wt. %, further preferably in the range of from 90 wt. % to 97 wt %, even further preferably in the range of from 91 wt. % to 96.5 wt %, most preferably in the range of from 92 wt. % to 96 wt. %, (ii) aluminum (Al) in amounts of from 0.025 wt. % to 50 wt. %, especially in the range of from 0.04 wt. % to 45 wt. %, preferentially in the range of from 0.05 wt. % to 40 wt. %, preferably in the range of from 0.075 wt. % to 30 wt. %, more preferably in the range of from 0.1 wt. % to 20 wt %, even more preferably in the range of from 1.5 wt. % to 15 wt. %, still more preferably in the range of from 2 wt. % to 12.5 wt. %, further preferably in the range of from 3 wt. % to 10 wt. %, even further preferably in the range of from 3.5 wt. % to 9 wt. %, most preferably in the range of from 4 wt. % to 8 wt. %, (iii) optionally one or more further metal, especially selected from the group of bismuth (Bi), lead (Pb), tin (Sn), nickel (Ni), silicon (Si), magnesium (Mg) as well as combinations thereof, especially in amounts of from 0.001 wt. % to 10 wt. %, especially in the range of from 0.001 wt. % to 9 wt. %, preferentially in the range of from 0.01 wt % to 8 wt. %, preferably in the range of from 0.02 wt. % to 6 wt. %, more preferably in the range of from 0.05 wt. % to 5 wt. %, even more preferably in the range of from 0.1 wt. % to 4 wt. %, still more preferably in the range of from 0.2 wt. % to 3.5 wt. %, further preferably in the range of from 0.3 wt. % to −3 wt. %, even further preferably in the range of from 0.4 wt. % to 2 wt. %, most preferably in the range of from 0.5 wt. % to 1 wt. %;

especially with the proviso that the magnesium content is less than 0.2 wt. %, especially less than 0.15 wt. %.

Furthermore, it has also proved especially useful within the scope of the present invention that the aluminum-containing and/or aluminum-alloyed hot-dip galvanizing layer has the following composition, wherein all quantities stated below relate to the aluminum-containing and/or aluminum-alloyed hot-dip galvanizing layer and are to be selected in such a way that a total of 100 wt. % results, and/or wherein the aluminum-containing and/or aluminum-alloyed zinc melt (used to produce the aluminum-containing and/or aluminum-alloyed hot-dip galvanizing layer) has the following composition, wherein all quantities stated below relate to the aluminum-containing and/or aluminum-alloyed zinc melt and are to be selected such that a total of 100 wt. % results:

(i) zinc (Zn) in amounts of from 70 wt. % to 99.5 wt %, especially in the range of from 90 wt. % to 99 wt %, (ii) aluminum (Al) in amounts of from 0.5 wt. % to 20 wt. %, especially in the range of from 1 wt. % to 10 wt. %, (iii) optionally one or more further metal, especially selected from the group of bismuth (Bi), lead (Pb), tin (Sn), nickel (Ni), silicon (Si), magnesium (Mg) as well as combinations thereof, especially in amounts of from 0.001 wt. % to 10 wt. %, especially in the range of from 0.001 wt. % to 6 wt. %;

especially with the proviso that the magnesium content is less than 0.2 wt. %, especially less than 0.15 wt. %.

Furthermore, it has also proved especially useful within the scope of the present invention for the aluminum-containing and/or aluminum-alloyed hot-dip galvanizing layer has the following composition, wherein all quantities stated below relate to the aluminum-containing and/or aluminum-alloyed hot-dip galvanizing layer and are to be selected in such a way that a total of 100 wt. % results, and/or wherein the aluminum-containing and/or aluminum-alloyed zinc melt (used to produce the aluminum-containing and/or aluminum-alloyed hot-dip galvanizing layer) has the following composition, wherein all quantities stated below relate to the aluminum-containing and/or aluminum-alloyed zinc melt and are to be selected such that a total of 100 wt. % results:

(i) zinc (Zn) in amounts of from 90 wt. % to 99 wt. %, (ii) aluminum (Al) in amounts of from 1 wt. % to 10 wt %, (iii) optionally one or more further metal, especially selected from the group of bismuth (Bi), lead (Pb), tin (Sn), nickel (Ni), silicon (Si), magnesium (Mg) and combinations thereof, especially in amounts of from 0.001 wt. % to 6 wt. %;

especially with the proviso that the magnesium content is less than 0.2 wt. %, especially less than 0.15 wt. %.

The aforedescribed composition and/or formation of the aluminum-containing and/or aluminum-alloyed hot-dip galvanizing layer, especially the aluminum content of the aluminum-containing and/or aluminum-alloyed hot-dip galvanizing layer, can be adjusted and/or controlled within the scope of the present invention by means of the aluminum-containing and/or aluminum-alloyed zinc melt used in the hot-dip galvanizing. This is known as such to the person skilled in the art, so that no further explanations on this aspect are required.

In the context of the present invention, it may especially be provided that the blaze resistance and/or the fire resistance is adjusted and/or controlled by means of the thickness and composition and/or formation of the aluminum-containing and/or aluminum-alloyed hot-dip galvanizing layer, especially by means of the aluminum content of the aluminum-containing and/or aluminum-alloyed hot-dip galvanizing layer:

Especially, in this context, with an increase of the aluminum content of the aluminum-containing and/or aluminum-alloyed hot-dip galvanizing layer, the blaze resistance and/or the fire resistance can be increased and/or with an increase in the layer thickness of the aluminum-containing and/or aluminum-alloyed hot-dip galvanizing layer, the blaze resistance and/or the fire resistance can be increased.

According to an embodiment of the invention which is particularly preferred, the aluminum-containing and/or aluminum-alloyed hot-dip galvanizing layer is applied to the steel component with a layer thickness in the range of from 4 μm to 25 μm.

In this context, it is particularly preferably the case that the aluminum-containing and/or aluminum-alloyed hot-dip galvanizing layer has an aluminum content, based on the aluminum-containing and/or aluminum-alloyed hot-dip galvanizing layer, in the range of from 4 wt. % to 8 wt. %, and/or wherein the aluminum-containing and/or aluminum-alloyed zinc melt (used to produce the aluminum-containing and/or aluminum-alloyed hot-dip galvanizing layer) has an aluminum content, based on the aluminum-containing and/or aluminum-alloyed zinc melt, in the range of from 4 wt. % to 8 wt. %.

It is also particularly preferable in accordance with the inventive method that the aluminum-containing and/or aluminum-alloyed hot-dip galvanizing layer and/or the aluminum-containing and/or aluminum-alloyed zinc melt (used to produce the aluminum-containing and/or aluminum-alloyed hot-dip galvanizing layer), respectively, has the following composition, wherein all quantities stated below relate in the case of the aluminum-containing and/or aluminum-alloyed hot-dip galvanizing layer to the aluminum-containing and/or aluminum-alloyed hot-dip galvanizing layer and/or in the case of the aluminum-containing and/or aluminum-alloyed zinc melt (used to produce the aluminum-containing and/or aluminum-alloyed hot-dip galvanizing layer) to the aluminum-containing and/or aluminum-alloyed hot-dip galvanizing melt and are to be selected in such a way that a total of 100 wt. % results:

(i) zinc (Zn) in amounts of from 92 wt. % to 96 wt. %,
(ii) aluminum (Al) in amounts of from 4 wt. % to 8 wt. %,
(iii) optionally one or more further metal, selected from the group of bismuth (Bi), lead (Pb), tin (Sn), nickel (Ni), silicon (Si), magnesium (Mg) as well as combinations thereof, especially in amounts of from 0.001 wt. % to 10 wt. %;
especially with the proviso that the magnesium content is less than 0.2 wt. %, especially less than 0.15 wt. %.

According to a particular embodiment of the method according to the invention, the present invention relates especially also to a method for generating (producing) blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2:2016-12 and/or DIN 4102-2:1977-09, especially a method for generating (producing) a blaze-resistant and/or fire-resistant steel component, especially a blaze-resistant and/or fire-resistant steel component in accordance with DIN EN 13501-2:2016-12 and/or DIN 4102-2:1977-09, especially a method as described hereinabove,
wherein the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, wherein the aluminum-containing and/or aluminum-alloyed hot-dip galvanizing layer is applied to the steel component with a layer thickness in the range of from 4 μm to 25 μm, and
wherein the aluminum-containing and/or aluminum-alloyed hot-dip galvanizing layer has an aluminum content, based on the aluminum-containing and/or aluminum-alloyed hot-dip galvanizing layer, in the range of from 4 wt. % to 8 wt. %;
in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., an emissivity (emission degree) of the surface $\varepsilon_m$ below at most 0.65, preferentially at most 0.60, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., an emissivity (emission degree) of the surface $\varepsilon_m$ in the range of from 0.05 to 0.65, preferentially in the range of from 0.05 to 0.60.

According to this particular embodiment, it is especially preferred that the aluminum-containing and/or aluminum-alloyed hot-dip galvanizing layer has the following composition, wherein all quantities stated below relate to the aluminum-containing and/or aluminum-alloyed hot-dip galvanizing layer and are to be selected such that a total of 100 wt. % results:

(i) zinc (Zn) in amounts of from 92 wt. % to 96 wt. %,
(ii) aluminum (Al) in amounts of from 4 wt. % to 8 wt. %,
(iii) optionally one or more further metal, selected from the group of bismuth (Bi), lead (Pb), tin (Sn), nickel (Ni), silicon (Si), magnesium (Mg) and combinations thereof, especially in amounts of from 0.001 wt. % to 10 wt. %; especially with the proviso that the magnesium content is less than 0.2 wt. %, especially less than 0.15 wt. %.

According to this particular embodiment, it is especially further preferred that the aluminum-containing and/or aluminum-alloyed hot-dip galvanizing layer, based on the aluminum-containing and/or aluminum-alloyed hot-dip galvanizing layer, has a proportion of optionally present magnesium of less than 0.2 wt %, especially less than 0.15 wt. %.

According to a further particular embodiment of the method according to the invention, the present invention relates especially also to a method for generating (producing) blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2:2016-12 and/or DIN 4102-2:1977-09, especially a method for providing a blaze-resistant and/or fire-resistant steel component, especially a blaze-resistant and/or fire-resistant steel component in accordance with DIN EN 13501-2:2016-12 and/or DIN 4102-2:1977-09, especially a method as described hereinabove,
wherein the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, wherein the aluminum-containing and/or aluminum-alloyed hot-dip galvanizing layer is applied to the steel component with a layer thickness in the range of from 4 μm to 25 μm, and wherein the aluminum-containing and/or aluminum-alloyed hot-dip galvanizing layer has an aluminum content, based on the aluminum-containing and/or aluminum-alloyed hot-dip galvanizing layer, in the range of from 4 wt. % to 8 wt. %;

in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., an emissivity (emission degree) of the surface $\varepsilon_m$ below at most 0.65, preferentially at most 0.60, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., an emissivity (emission degree) of the surface $\varepsilon_m$ in the range of from 0.05 to 0.65, preferentially in the range of from 0.05 to 0.60;

wherein the aluminum-containing and/or aluminum-alloyed hot-dip galvanizing layer has the following composition, wherein all quantities stated below relate to the aluminum-containing and/or aluminum-alloyed hot-dip galvanizing layer and are to be selected such that a total of 100 wt. % results:

(i) zinc (Zn) in amounts of from 92 wt. % to 96 wt. %, (ii) aluminum (Al) in amounts of from 4 wt. % to 8 wt. %, (iii) optionally one or more further metal, selected from the group of bismuth (Bi), lead (Pb), tin (Sn), nickel (Ni), silicon (Si), magnesium (Mg) as well as combinations thereof, especially in amounts of from 0.001 wt % to 10 wt. %; especially with the proviso that the magnesium content is less than 0.2 wt. %, especially less than 0.15 wt. %.

According to yet another particular embodiment of the method according to the invention, the present invention relates especially also to a method for generating (producing) blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2:2016-12 and/or DIN 41022-:1977-09, especially a method for generating (producing) a blaze-resistant and/or fire-resistant steel component, especially a blaze-resistant and/or fire-resistant steel component in accordance with DIN-EN 135012:-2016-12 and/or DIN 4102-2: 1977-09, especially a method as described hereinabove, wherein the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, wherein the aluminum-containing and/or aluminum-alloyed hot-dip galvanizing layer is applied to the steel component with a layer thickness in the range of from 2.5 μm to 70 μm, and wherein the aluminum-containing and/or aluminum-alloyed hot-dip galvanizing layer has an aluminum content, based on the aluminum-containing and/or aluminum-alloyed hot-dip galvanizing layer, in the range of from 1 wt. % to 10 wt. %;

in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the temperature range of from 500° C. to 850° C., an emissivity (emission degree) of the surface $\varepsilon_m$ below at most 0.65, preferentially at most 0.60, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., an emissivity (emission degree) of the surface $\varepsilon_m$ in the range of from 0.05 to 0.65, preferentially in the range of from 0.05 to 0.60.

According to this particular embodiment, it is especially preferred that the aluminum-containing and/or aluminum-alloyed hot-dip galvanizing layer has the following composition, wherein all quantities stated below relate to the aluminum-containing and/or aluminum-alloyed hot-dip galvanizing layer and are to be selected such that a total of 100 wt. % results:

(i) zinc (Zn) in amounts of from 90 wt. % to 99 wt. %, (ii) aluminum (Al) in amounts of from 1 wt. % to 10 wt. %, (iii) optionally one or more further metal, selected from the group of bismuth (Bi), lead (Pb), tin (Sn), nickel (Ni), silicon (Si), magnesium (Mg) as well as combinations thereof, especially in amounts of from 0.001 wt. % to 6 wt. %;

especially with the proviso that the magnesium content is less than 0.2 wt. %, especially less than 0.15 wt. %.

According to this particular embodiment, it is especially further preferred that the aluminum-containing and/or aluminum-alloyed hot-dip galvanizing layer, based on the aluminum-containing and/or aluminum-alloyed hot-dip galvanizing layer, has a proportion of optionally present magnesium of less than 0.2 wt % %, especially less than 0.15 wt. %.

According to yet another particular embodiment of the method according to the invention, the present invention relates especially also to a method for generating (producing) blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2:2016-12 and/or DIN 41022:1977-09, especially a method for generating (producing) a blaze-resistant and/or fire-resistant steel component, especially a blaze-resistant and/or fire-resistant steel component in accordance with DIN EN 13501-2:2016-12 and/or DIN 4102-2:1977-09, especially a method as described hereinabove, wherein the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, wherein the aluminum-containing and/or aluminum-alloyed hot-dip galvanizing layer is applied to the steel component with a layer thickness in the range of from 2.5 μm to 70 μm, and wherein the aluminum-containing and/or aluminum-alloyed hot-dip galvanizing layer has an aluminum content, based on the aluminum-containing and/or aluminum-alloyed hot-dip galvanizing layer, in the range of from 1 wt. % to 10 wt. %;

in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the temperature range of from 500° C. to 850° C., an emissivity (emission degree) of the surface $\varepsilon_m$ below at most 0.65, preferentially at most 0.60, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., an emissivity (emission degree) of the surface $\varepsilon_m$ in the range of from 0.05 to 0.65, preferentially in the range of from 0.05 to 0.60;

wherein the aluminum-containing and/or aluminum-alloyed hot-dip galvanizing layer has the following composition, wherein all quantities stated below relate to the aluminum-containing and/or aluminum-alloyed hot-dip galvanizing layer and are to be selected such that a total of 100 wt. % results:

(i) zinc (Zn) in amounts of from 90 wt % to 99 wt. %, (ii) aluminum (Al) in amounts of from 1 wt. % to 10 wt. %, (iii) optionally one or more further metal, selected from the group of bismuth (Bi), lead (Pb), tin (Sn), nickel (Ni), silicon (Si), magnesium (Mg) and combinations thereof, especially in amounts of from 0.001 wt. % to 6 wt. %;

especially with the proviso that the magnesium content is less than 0.2 wt. %, especially less than 0.15 wt. %.

With the above-mentioned more preferably embodiments, particularly good results are obtained within the scope of the blaze resistance and/or fire resistance aimed at according to the invention.

In order to achieve particularly good results with regard to blaze resistance and/or fire resistance, it has proved advantageous in accordance with the inventive method that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures above 500° C., especially at temperatures above 550° C., preferentially at temperatures above 600° C., more preferably in the temperature range of from 500° C. to 850° C., even more preferably in the temperature range of from 500° C. to 800° C., an emissivity (emission degree) of the surface $\varepsilon_m$ below 0.7 (i.e. thus $\varepsilon_m \geq 0.7$), especially of at most 0.65, preferentially of at most 0.60, more preferably of at most 0.55, most preferably at most 0.50. In this way, particularly good results are obtained in accordance with the inventive method.

It is also advantageous in the context of the present invention that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., especially at temperatures in the range of from 500° C. to 800° C., an emissivity (emission degree) of the surface $\varepsilon_m$ below 0.7, especially in the range of from 0.05 to <0.7, preferentially in the range of from 0.05 to 0.65, more preferably in the range of from 0.05 to 0.60, even more preferably in the range of from 0.05 to 0.55. Also in this way particularly good results are obtained in accordance with the inventive method.

In accordance with a more preferable embodiment of the present invention, it is provided that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 650° C., an emissivity (emission degree) of the surface $\varepsilon_m$ of at most 0.40, especially of at most 0.35, preferentially of at most 0.30, more preferably of at most 0.25, and that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 650° C. to 850° C., an emissivity (emission degree) of the surface $\varepsilon_m$ of at most 0.65, especially of at most 0.60, preferentially of at most 0.55.

This more preferable embodiment is to be considered especially if the aluminum-containing and/or aluminum-alloyed hot-dip galvanizing layer is applied to the steel component with a layer thickness in the range of from 4 μm to 25 μm; and/or.

if the aluminum-containing and/or aluminum-alloyed hot-dip galvanizing layer has an aluminum content, based on the aluminum-containing and/or aluminum-alloyed hot-dip galvanizing layer, in the range of from 4 wt % to 8 wt. %, and/or if wherein the aluminum-containing and/or aluminum-alloyed zinc melt (used to produce the aluminum-containing and/or aluminum-alloyed hot-dip galvanizing layer) has an aluminum content, based on the aluminum-containing and/or aluminum-alloyed zinc melt, in the range of from 4 wt % to 8 wt. %, respectively; and/or if the aluminum-containing and/or aluminum-alloyed hot-dip galvanizing layer has the following composition, wherein all quantities stated below relate to the aluminum-containing and/or aluminum-alloyed hot-dip galvanizing layer and are to be selected in such a way that a total of 100 wt. % results, and/or if the aluminum-containing and/or aluminum-alloyed zinc melt (used to produce the aluminum-containing and/or aluminum-alloyed hot-dip galvanizing layer) has the following composition, wherein all quantities stated below relate to the aluminum-containing and/or aluminum-alloyed zinc melt and are to be selected such that a total of 100 wt. % results:

(i) zinc (Zn) in amounts of from 92 wt. % to 96 wt. %, (ii) aluminum (Al) in amounts of from 4 wt % to 8 wt. %, (iii) optionally one or more further metal, selected from the group of bismuth (Bi), lead (Pb), tin (Sn), nickel (Ni), silicon (Si), magnesium (Mg) and combinations thereof, especially in amounts of from 0.001 wt. % to 10 wt. %, especially with the proviso that the magnesium content is less than 0.2 wt. %, especially less than 0.15 wt. %.

According to another more preferable embodiment of the present invention, it is provided that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., an emissivity (emission degree) of the surface $\varepsilon_m$ below at most 0.65, preferentially at most 0.60, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., an emissivity (emission degree) of the surface $\varepsilon_m$ in the range of from 0.05 to 0.65, preferentially in the range of from 0.05 to 0.60.

In contrast to this, before application of the aluminum-containing and/or aluminum-alloyed hot-dip galvanizing layer, the steel component has, at temperatures above 500° C., especially at temperatures in the range of from 500° C. to 850° C., an emissivity (emission degree) of the surface $\varepsilon_m \geq 0.7$.

The term emissivity (emission degree) of the surface $\varepsilon_m$ of the steel component provided with the aluminum-containing and/or aluminum-alloyed hot-dip galvanized coating especially corresponds to the definition and/or determination in accordance with DIN EN 1993-1-2:2006-10 (=emissivity (emission degree) of the surface $\varepsilon_m$ in accordance with DIN EN 1993-1-2:2006-10).

The emissivity (emission degree) of the surface $\varepsilon_m$ of the steel component provided with the aluminum-containing and/or aluminum-alloyed hot-dip galvanized coating can be determined using methods and/or procedures known to the skilled person. Especially, it is provided in this context that the emissivity (emission degree) of the surface $\varepsilon_m$, especially in accordance with DIN EN 1993-1-2:2006-10, of the steel component provided with the aluminum-containing and/or aluminum-alloyed hot-dip galvanizing layer is determined and/or evaluated from the temperature profile under continuous and/or increasing thermal load, especially in the case of fire (especially in accordance with DIN EN 1993-1-2:2006-10). Especially, the emissivity (emission degree) of the surface $\varepsilon_m$, especially in accordance with DIN EN 1993-1-2:2006-10, can be determined and/or evaluated by an emissivity performance test according to C. Gaigl und M. Mensinger, Technical Report "*Thermal impact on HDG construction*", Technical University Munich, February 2018, and/or according to M. Mensinger und C. Gaigl, essay "*Feuerwiderstand verzinkter Stahlkonstruktionen*", Stahlbau, Vol. 88, pages 3 bis 10, January 2019.

As previously stated, the steel component provided with the aluminum-containing and/or aluminum-alloyed hot-dip galvanizing layer and/or the steel component subjected to hot-dip galvanizing using an aluminum-containing and/or aluminum-alloyed galvanizing bath is blaze-resistant and/or fire-resistant.

Within the scope of the present invention, it is particularly preferred that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has a fire resistance class in accordance with DIN 4102-2:1977-09 of at least F30, especially of at least F60, preferentially of at least F90, more preferably of at least F120.

Furthermore, it is equally preferred in the context of the present invention that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has a fire resistance class in accordance with DIN EN 13501-2:2016-12 of at least R30, especially of at least R60, preferentially of at least R90, more preferably of at least R120.

As far as the steel component used in the inventive method is concerned, basically any steel components can be used.

In the context of the present invention, it is especially advantageous if the steel of the steel component is selected from (i) low silicon steel, especially with a silicon content $\leq 0.03$ wt % and with a phosphorus content $<0.02$ wt. %, based on the steel; (ii) Sandelin steel, especially with a silicon content between 0.03 wt. % and 0.14 wt. %, based on the steel; (iii) Sebisty steel, especially with a silicon content between 0.14 wt. % and 0.25 wt. %; (iv) high silicon steel, especially with a silicon content $>0.25$ wt %, based on the steel; and combinations thereof.

In the context of the present invention, it is especially equally advantageous if the steel of the steel component is selected from steel of categories A, B, C and/or D in accordance with DIN EN ISO 14713-2:2020-05 and combinations thereof.

Also advantageous in the context of the present invention is that the steel component is a steel structural element, a steel beam, a steel section, a sectional steel, a steel sheet, a steel tube or the like.

Especially it can be provided according to the inventive that the steel component is a steel component intended for the building industry and/or wherein the steel component is a steel structural element or component intended for the building industry.

Furthermore, in accordance with the inventive method, it can especially be provided that the steel component is a steel component intended or designed for the building industry and/or for vehicle construction or automobile manufacture.

As far as the aluminum-containing and/or aluminum-alloyed hot-dip galvanizing layer applied to the steel component is concerned, this can be applied by methods of hot-dip galvanizing known per se (synonymously also as hot-dip galvanizing), so that no further explanations are required in this respect.

Hot-dip galvanizing is probably the most important method for protecting steel against corrosion by means of metallic coatings; however, this method has not yet been associated with blaze protection and/or fire protection. In hot-dip galvanizing, steel is immersed continuously (e.g. strip and wire) or piece by piece (e.g. components) at temperatures of around 450° C. to 600° C. in a heated tank containing liquid zinc (melting point of zinc: 419.5° C.), so that a resistant alloy layer of iron and zinc is provided on the steel surface, with a very firmly adhering pure zinc layer on top.

In hot-dip galvanizing, a distinction is made between discontinuous batch galvanizing (see, for example, DIN EN ISO 1461) and continuous strip galvanizing (see, for example, DIN EN 10143 and DIN EN 10346). Both continuous and strip galvanizing are standardized and/or normed methods. Strip galvanized steel is a preliminary and/or intermediate product (semi-finished product) which is further processed after galvanizing, especially by forming, stamping, cutting to size, etc., whereas components to be protected by piece galvanizing (discontinuous batch galvanizing) are first completely manufactured and only then hot-dip galvanized (which protects the components from corrosion on all sides). Piece galvanizing and strip galvanizing also differ in terms of zinc coating thickness, which results in different protection durations. The zinc coating thickness of strip galvanized sheets is usually no more than 20 to 25 micrometers, whereas the zinc coating thicknesses of piece galvanized steel parts are usually in the range of 50 to 200 micrometers and even more.

Hot-dip galvanizing provides both active and passive corrosion protection. Passive protection is provided by the barrier effect of the zinc coating. The active corrosion protection results from the cathodic effect of the zinc coating. In relation to more noble metals of the electrochemical series, such as iron, zinc serves as a sacrificial anode that protects the underlying iron from corrosion until it is itself completely corroded.

In so-called piece galvanizing in accordance with DIN EN ISO 1461, the hot-dip galvanizing of mostly larger steel components and structures takes place. Steel-based blanks or finished workpieces (components) are immersed in the molten zinc bath after pretreatment. Dipping especially allows good access to inner surfaces, weld seams and hard-to-reach areas of the workpieces and/or components to be galvanized.

Conventional hot-dip galvanizing is based especially on dipping iron and/or steel components in a molten zinc bath while providing a zinc coating and/or zinc coat on the surface of the components. To ensure adhesion, cohesiveness and uniformity of the zinc coating, careful surface preparation of the components to be galvanized is generally required in advance, which usually involves degreasing followed by a rinsing process, subsequent acid pickling followed by a rinsing process and finally flux treatment (i.e. fluxing) followed by a drying process.

Typically, in the context of the present invention, the hot-dip galvanizing can be performed at a temperature in the range of from 375° C. to 750° C., especially temperature in the range of from 380° C. to 700° C., preferentially temperature in the range of from 390° C. to 680° C., even more preferably in the range of from 395° C. to 675° C.

Furthermore, in the context of the present invention, the hot dip galvanizing is performed for a time sufficient to provide effective hot dip galvanizing, especially for a time in the range of from 0.0001 to 60 minutes, preferentially in the range of from 0.001 to 45 minutes, preferably in the range of from 0.01 to 30 minutes, more preferably in the range of from 0.1 to 15 minutes.

The typical method sequence for hot-dip galvanizing carried out in accordance with the inventive method is usually as follows.

In the context of the present invention, hot-dip galvanizing is performed especially in such a way that the hot-dip galvanizing, including the pretreatment and/or post-treatment procedure, comprises the following method steps, especially in the order listed below (although further steps may be added if necessary, but these are optional):

(a) degreasing treatment, preferentially alkaline degreasing treatment, of the steel component, especially in at least one degreasing bath;

(b) optionally, rinsing the steel component degreased in method step (a), especially in at least one rinsing bath;

(c) pickling treatment, preferentially acid pickling treatment, of the steel component degreased in method step (a) and optionally rinsed in method step (b), especially in at least one pickling bath;

(d) optionally, rinsing the steel component pickled in method step (c), especially in at least one rinsing bath;

(e) flux treatment of the steel component pickled in method step (c) and optionally rinsed in method step (d) by means of a flux composition in a flux bath;

(f) optionally, drying treatment of the steel component subjected to flux treatment in method step (e);

(g) hot-dip galvanizing of the steel component subjected to flux treatment in method step (e) and optionally dried in method step (f) in an aluminum-containing and/or aluminum-alloyed zinc melt, preferentially by dipping the steel component in the aluminum-containing and/or aluminum-alloyed zinc melt.

If necessary, within the scope of the present invention, the hot-dip galvanizing carried out in method step (g) can be followed by a cooling step (h) and/or the steel component hot-dip galvanized in method step (g) can be subjected to a cooling treatment (h), optionally followed by a further finishing and/or post-treatment step (i). Especially, the cooling step (h) and/or the cooling treatment (h) can be carried out by means of air and/or in the presence of air, preferentially down to ambient temperature.

In the context of the present invention, it is also preferred that the hot-dip galvanizing is performed as piece galvanizing, especially discontinuous piece galvanizing, preferentially in accordance with DIN 50997:2020-08 (i.e. zinc/aluminum coatings applied to steel by thin-film galvanizing).

Within the scope of the present invention, it is further possible that the steel component provided with the aluminum-containing and/or aluminum-alloyed hot-dip galvanizing layer and/or the steel component subjected to hot-dip galvanizing using an aluminum-containing and/or aluminum-alloyed galvanizing bath and/or the aluminum-containing and/or aluminum-alloyed hot-dip galvanizing layer is subjected to an additional finishing and/or post-treatment, especially by means of passivation and/or by means of sealing, preferentially silicate coating or silicating. Such finishing and/or post-treatment methods are known as such to those skilled in the art, so that this aspect need not be explained further. In the context of the present invention, the additional post-treatment and/or surface treatment can exert a further positive influence with respect to the blaze resistance and/or fire resistance of the steel component.

A particularly suitable hot-dip galvanizing method according to the inventive method using a zinc/aluminum melt is disclosed, for example, in WO 2002/042512 A1 and the relevant printed equivalents to this patent family (e.g. EP 1 352 100 B1, DE 601 24 767 T2 and US 2003/0219543 A1). The method disclosed therein can be used to produce anti-corrosion coatings with very low film thicknesses (generally well below 50 micrometers and typically in the range of from 2 to 20 micrometers) and with very low weight at high cost efficiency, which is why the method described therein is used commercially under the name microZINQ® method.

As a result, the present invention provides an efficient and economical method for providing and/or upgrading steel components with blaze resistance and/or fire resistance, especially blaze resistance and/or fire resistance in accordance with DIN EN 13501-2:2016-12 and/or DIN 4102-2: 1977-09.

Furthermore, the present invention relates—according to a second aspect of the present invention—to the use of an aluminum-containing and/or aluminum-alloyed hot-dip galvanizing layer (especially an aluminum-containing and/or aluminum-alloyed hot-dip galvanizing layer as defined above and/or especially an aluminum-containing and/or aluminum-alloyed hot-dip galvanizing layer obtainable by the method described hereinabove in accordance with the first aspect of the invention, respectively) for generating (producing) blaze resistance and/or fire resistance and/or for providing (equipping) a steel component with blaze resistance and/or fire resistance explained in detail below.

The subject-matter of the present invention according to the second aspect of the invention is thus the use of an aluminum-containing and/or aluminum-alloyed hot-dip galvanizing layer (especially an aluminum-containing and/or aluminum-alloyed hot-dip galvanizing layer as defined hereinabove and/or especially an aluminum-containing and/or aluminum alloyed hot-dip galvanizing layer obtainable according to the method described hereinabove in accordance with the first aspect of the invention, respectively) for generating (producing) blaze resistance and/or fire resistance, especially blaze resistance and/or fire resistance in accordance with DIN EN 13501-2:2016-12 and/or DIN 4102-2:1977-09, on or onto a steel component and/or for providing a steel component with blaze resistance and/or fire resistance, especially with blaze resistance and/or fire resistance in accordance with DIN EN 13501-2:2016-12 and/or DIN 4102-2:1977-09, preferentially for generating (producing) a blaze-resistant and/or fire-resistant steel component, especially a blaze-resistant and/or fire-resistant steel component in accordance with DIN EN 13501-2:2016-12 and/or DIN 4102-2:1977-09.

Within the scope of the inventive use according to the second aspect of the invention, it can be especially provided that the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, especially in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures above 500° C., especially at temperatures above 550° C., preferentially at temperatures above 600° C., more preferably in the range of from 500° C. to 850° C., even more preferably in the range of from 500° C. to 800° C., an emissivity (emission degree) of the surface $\varepsilon_m$ below 0.7, especially of at most 0.65, preferentially of at most 0.60, more preferably of at most 0.55, even more preferably of at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., preferentially at temperatures in the range of from 500° C. to 800° C., an emissivity (emission degree) of the surface En below 0.7, especially in the range of from 0.05 to <0.7, preferentially in the range of from 0.05 to 0.65, more preferably in the range of from 0.05 to 0.60, even more preferably in the range of from 0.05 to 0.55.

For further details on the inventive use according to the second aspect of the invention, reference can be made to the above explanations with respect to the first aspect of the invention, which also apply in a corresponding manner to the inventive use according to the second aspect of the invention.

Furthermore, the present invention relates—according to a third aspect of the present invention—to the use of hot-dip galvanizing and/or of a hot-dip galvanizing method (especially as described hereinbefore in the context of the first aspect of the invention) for generating (producing) blaze resistance and/or fire resistance on or onto a steel component and/or for providing (equipping) a steel component with blaze resistance and/or fire resistance explained in detail below.

The subject-matter of the present invention according to the third aspect of the invention is thus the use of hot-dip galvanizing and/or of a hot-dip galvanizing method (especially as described hereinbefore in the context of the first aspect of the invention), for producing blaze resistance and/or fire resistance, especially blaze resistance and/or fire resistance in accordance with DIN EN 13501-2:2016-12 and/or DIN 4102-2:1977-09, on or onto a steel component and/or for providing (equipping) a steel component with blaze resistance and/or fire resistance, especially with blaze resistance and/or fire resistance in accordance with DIN EN 13501-2:2016-12 and/or DIN 4102-2:1977-09, especially for generating (producing) a blaze-resistant and/or fire-resistant steel component, preferentially a blaze-resistant and/or fire-resistant steel component in accordance with DIN EN 13501-2:2016-12 and/or DIN 4102-2:1977-09, wherein the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, especially in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures above 500° C., especially at temperatures above 550° C., preferentially at temperatures above 600° C., more preferably in the temperature range of from 500° C. to 850° C., even more preferably in the temperature range of from 500° C. to 800° C., an emissivity (emission degree) of the surface $\varepsilon_m$ below 0.7, especially at most 0.65, preferentially at most 0.60, more preferably at most 0.55, even more preferably at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., preferentially at temperatures in the range of from 500° C. to 800° C., an emissivity (emission degree) of the surface $\varepsilon_m$ below 0.7, especially in the range of from 0.05 to <0.7, preferentially in the range of from 0.05 to 0.65, more preferably in the range of from 0.05 to 0.60, even more preferably in the range of from 0.05 to 0.55.

For further details on the inventive use according to the third aspect of the invention, reference can be made to the above explanations with respect to the first and second aspects of the invention, which also apply in a corresponding manner to the inventive use according to the third aspect of the invention.

Furthermore, the present invention relates—according to a fourth aspect of the present invention—to the use of aluminum for increasing and/or improving the blaze resistance and/or the fire resistance of a hot-dip galvanized and/or hot-dip galvanized steel component explained in detail below.

Thus, the subject-matter of the present invention according to the fourth aspect of the invention is the use of aluminum (i.e. use of aluminum in the hot-dip galvanizing layer) for increasing and/or improving the blaze resistance and/or the fire resistance, especially the blaze resistance and/or the fire resistance in accordance with DIN EN 13501-2:2016-12 and/or DIN 4102-2:1977-09, of a hot-dip galvanized steel component and/or a steel component provided with a hot-dip galvanizing layer, wherein aluminum is incorporated and/or alloyed into the hot-dip galvanizing layer, especially in the manner and/or with the proviso that an aluminum-containing and/or aluminum-alloyed hot-dip galvanizing layer results and/or that the steel component is provided with an aluminum-containing and/or aluminum-alloyed hot-dip galvanizing layer (especially as described hereinabove under the first aspect of the invention).

Within the scope of the inventive use according to the fourth aspect of the invention, it can be especially provided that the steel component is provided with an aluminum-containing and/or aluminum-alloyed hot-dip galvanizing layer and/or wherein the steel component is subjected to hot-dip galvanizing using an aluminum-containing and/or aluminum-alloyed zinc melt, especially in such a way and/or with the proviso that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures above 500° C., especially at temperatures above 550° C., preferentially at temperatures above 600° C., more preferably in the temperature range of from 500° C. to 850° C., even more preferably in the temperature range of from 500° C. to 800° C., an emissivity (emission degree) of the surface $\varepsilon_m$ below 0.7, especially of at most 0.65, preferentially of at most 0.60, more preferably of at most 0.55, even more preferably of at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., preferentially at temperatures in the range of from 500° C. to 800° C., an emissivity (emission degree) of the surface $\varepsilon_m$ below 0.7, especially in the range of from 0.05 to <0.7, preferentially in the range of from 0.05 to 0.65, more preferably in the range of from 0.05 to 0.60, even more preferably in the range of from 0.05 to 0.55.

For further details on the inventive use according to the fourth aspect of the invention, reference can be made to the above explanations with respect to the first to third aspects of the invention, which also apply in a corresponding manner to the inventive use according to the fourth aspect of the invention.

For the inventive uses according to the second, third and fourth aspects of the invention, further, especially special and/or advantageous common embodiments of these inventive uses. The special features of these embodiments have already been described and explained above in connection with the first aspect of the invention and thus apply accordingly to the uses according to the invention.

Similarly, the present invention relates—according to a fifth aspect of the present invention—to the use of a steel component provided with an aluminum-containing and/or aluminum-alloyed hot-dip galvanizing layer (especially a steel component obtainable by the method described above according to the first aspect of the invention and provided with an aluminum-containing and/or aluminum-alloyed hot-dip galvanizing layer) as a structural component for complying with the requirements of blaze resistance and/or fire resistance explained in detail below.

The subject-matter of the present invention according to the fifth aspect of the invention is thus the use of a steel component provided with an aluminum-containing and/or aluminum-alloyed hot-dip galvanizing layer, especially a steel component obtainable according to a method according to the invention as described hereinabove and provided with an aluminum-containing and/or aluminum-alloyed hot-dip galvanizing layer, as a structural component for complying with the requirements of blaze resistance and/or fire resistance, especially blaze resistance and/or fire resistance in accordance with DIN EN 13501-2:2016-12 and/or DIN 4102-2:1977-09.

Within the scope of the inventive use according to the fifth aspect of the invention, it can be provided especially that the steel component provided with the aluminum-containing and/or aluminum-alloyed hot-dip galvanizing layer has, at temperatures above 500° C., especially at temperatures above 550° C., preferentially at temperatures above 600° C., even more preferably in the temperature range of from 500° C. to 800° C., more preferably in the temperature range of from 500° C. to 850° C., an emissivity (emission degree) of the surface $\varepsilon_m$ below 0.7, especially of at most 0.65, preferentially of at most 0.60, more preferably of at most 0.55, even more preferably of at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., preferably at temperatures in the range of from 500° C. to 800° C., an emissivity (emission degree) of the surface $\varepsilon_m$ below 0.7, especially in the range of from 0.05 to <0.7, preferentially in the range of from 0.05 to 0.65, more preferably in the range of from 0.05 to 0.60, even more preferably in the range of from 0.05 to 0.55.

According to a particular embodiment according to the fifth aspect of the invention, it may further be preferred that the steel component provided with the aluminum-containing and/or aluminum-alloyed hot-dip galvanizing layer is used in the absence of and/or without additional structural fire protection measures and devices.

For further details on the inventive use according to the fifth aspect of the invention, reference can be made to the above explanations with respect to the first to fourth aspects of the invention, which also apply in a corresponding manner to the inventive use according to the fifth aspect of the invention.

Moreover, the subject-matter of the present invention—according to a sixth aspect of the present invention—is the use a steel component provided with an aluminum-containing and/or aluminum-alloyed hot-dip galvanizing layer (especially a steel component obtainable by the method described hereinabove according to the first aspect of the invention and provided with an aluminum-containing and/or aluminum-alloyed hot-dip galvanizing layer) as a structural component of receiving devices, especially enclosures or containers, for energy stores or energy converters, such as fuel cells, accumulators, batteries, galvanic elements or the like, especially for the automotive sector, preferentially to meet the requirements of blaze resistance and/or fire resistance, further, especially special and/or advantageous embodiments of the use according to the invention are explained in detail below.

The subject-matter of the present invention according to the sixth aspect of the invention is thus the use of a steel component provided with an aluminum-containing and/or aluminum-alloyed hot-dip galvanizing layer, especially a steel component obtainable by a method according to the invention as described hereinabove and provided with an aluminum-containing and/or aluminum-alloyed hot-dip galvanizing layer, as a structural component of receiving devices, especially enclosures or containers, for energy stores or energy converters, such as fuel cells, accumulators, batteries, galvanic elements or the like, especially for the automotive sector, preferentially to meet the requirements of blaze resistance and/or fire resistance.

Within the scope of the inventive use according to the sixth aspect of the invention, it can be provided especially that the steel component provided with the aluminum-containing and/or aluminum-alloyed hot-dip galvanizing layer has, at temperatures above 500° C., especially at temperatures above 550° C., preferentially at temperatures above 600° C., more preferably in the temperature range of from 500° C. to 850° C., even more preferably in the temperature range of from 500° C. to 800° C., an emissivity (emission degree) of the surface $\varepsilon_m$ below 0.7, especially of at most 0.65, preferentially of at most 0.60, more preferably of at most 0.55, even more preferably of at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., preferably at temperatures in the range of from 500° C. to 800° C., an emissivity (emission degree) of the surface $\varepsilon_m$ below 0.7, especially in the range of from 0.05 to <0.7, preferentially in the range of from 0.05 to 0.65, more preferably in the range of from 0.05 to 0.60, even more preferably in the range of from 0.05 to 0.55.

For further details on the inventive use according to the sixth aspect of the invention, reference can be made to the above explanations with respect to the first to fifth aspects of the invention, which also apply in a corresponding manner to the inventive use according to the sixth aspect of the invention.

Similarly, the present invention relates—according to a seventh aspect of the present invention—to a supporting structure, especially a steel structure, for a construction, especially for a building or part of a building; further, especially special and/or advantageous embodiments of the supporting structure according to the invention are explained in detail below.

The subject-matter of the present invention according to the seventh aspect of the invention is thus a supporting structure, especially a steel supporting structure, for a construction, especially for a building or part of a building, wherein the supporting structure comprises, as structural design components for complying with the requirements of blaze resistance and/or fire resistance, especially blaze resistance and/or fire resistance in accordance with DIN EN 13501-2:2016-12 and/or DIN 4102-2:1977-09, a plurality of steel structural components provided with an aluminum-containing and/or aluminum-alloyed hot-dip galvanizing layer, especially a plurality of steel structural components provided with an aluminum-containing and/or aluminum-alloyed hot-dip galvanizing layer obtainable by a method according to the invention as described above and provided with an aluminum-containing and/or aluminum-alloyed hot-dip galvanizing layer, wherein the supporting structure is free of additional structural fire protection measures and devices and/or the supporting structure has no additional structural fire protection elements Within the scope of the seventh aspect of the invention according to the invention, it can be provided especially that the steel components provided with the aluminum-containing and/or aluminum-alloyed hot-dip galvanizing layer has, at temperatures above 500° C., especially at temperatures above 550° C., preferentially at temperatures above 600° C., more preferably in the temperature range of from 500° C. to 850° C., even more preferably in the temperature range of from 500° C. to 800° C., an emissivity (emission degree) of the surface $\varepsilon_m$ below 0.7, especially of at most 0.65, preferentially of at most 0.60, more preferably of at most 0.55, even more preferably of at most 0.50, and/or that the steel component provided with the aluminum-containing and/or aluminum-alloyed hot-dip galvanizing layer and/or the steel component subjected to hot-dip galvanizing using an aluminum-containing and/or aluminum-alloyed galvanizing bath has, at temperatures in the range of from 500° C. to 850° C., preferably at temperatures in the range of from 500° C. to 800° C., an emissivity (emission degree) of the surface En below 0.7, especially in the range of from 0.05 to <0.7, preferentially in the range of from 0.05 to 0.65, more preferably in the range of from 0.05 to 0.60, even more preferably in the range of from 0.05 to 0.55.

For further details on the seventh aspect of the invention, reference may be made to the above explanations with respect to the first through sixth aspects of the invention, which also apply in a corresponding manner to the seventh aspect of the invention.

Furthermore, the present invention relates—in accordance with an eighth aspect of the present invention—to a construction comprising the supporting structure according to the invention, especially a building or part of a building; further, especially special and/or advantageous embodiments of the structure according to the invention are explained in detail below.

The subject-matter of the present invention according to the eighth aspect of the invention is thus a construction, especially a building or part of a building, which comprises a supporting structure according to the seventh aspect of the invention as described above.

In the context of the seventh aspect of the invention, it can be especially provided that the construction is free of additional structural fire protection measures and devices and/or the construction has no additional structural fire protection elements.

For further details on the eighth aspect of the invention, reference may be made to the above explanations with respect to the first through seventh aspects of the invention, which also apply in a corresponding manner to the seventh aspect of the invention.

Finally, subject-matter of the present invention—according to a ninth aspect of the present invention—is the use an aluminum-containing and/or aluminum-alloyed hot-dip galvanizing layer (especially an aluminum-containing and/or aluminum-alloyed hot-dip galvanizing layer as described or defined hereinabove and/or especially an aluminum containing and/or aluminum-alloyed hot-dip galvanizing layer obtainable according to the inventive method or use, respectively) for generating (producing) blaze resistance and/or fire resistance on or onto iron-based or iron containing, especially steel-based or steel-containing, articles and/or for providing (equipping) iron-based or iron-containing, especially steel-based or steel-containing, articles with blaze resistance and/or fire resistance; further, especially special and/or advantageous embodiments of the structure according to the invention are explained in detail below.

Thus, the subject-matter of the present invention according to the ninth aspect of the invention is the use of an aluminum-containing and/or aluminum-alloyed hot-dip galvanizing coating for generating (producing) blaze resistance and/or fire resistance on iron-based or iron-containing, especially steel-based or steel-containing, articles and/or for providing (equipping) iron-based or iron-containing, especially steel-based or steel-containing articles with blaze resistance and/or fire resistance For further details on the ninth aspect of the invention, reference can be made to the above explanations with respect to the first through eighth aspects of the invention, which also apply in a corresponding manner to the ninth aspect of the invention.

The present invention is also described with reference to further drawings and/or figure representations, wherein the relevant statements apply to all aspects of the invention and wherein the relevant statements are in no way restrictive; regarding the drawings and/or figure representations, reference can also be made to the following statements according to the exemplary embodiments.

Figure 2:
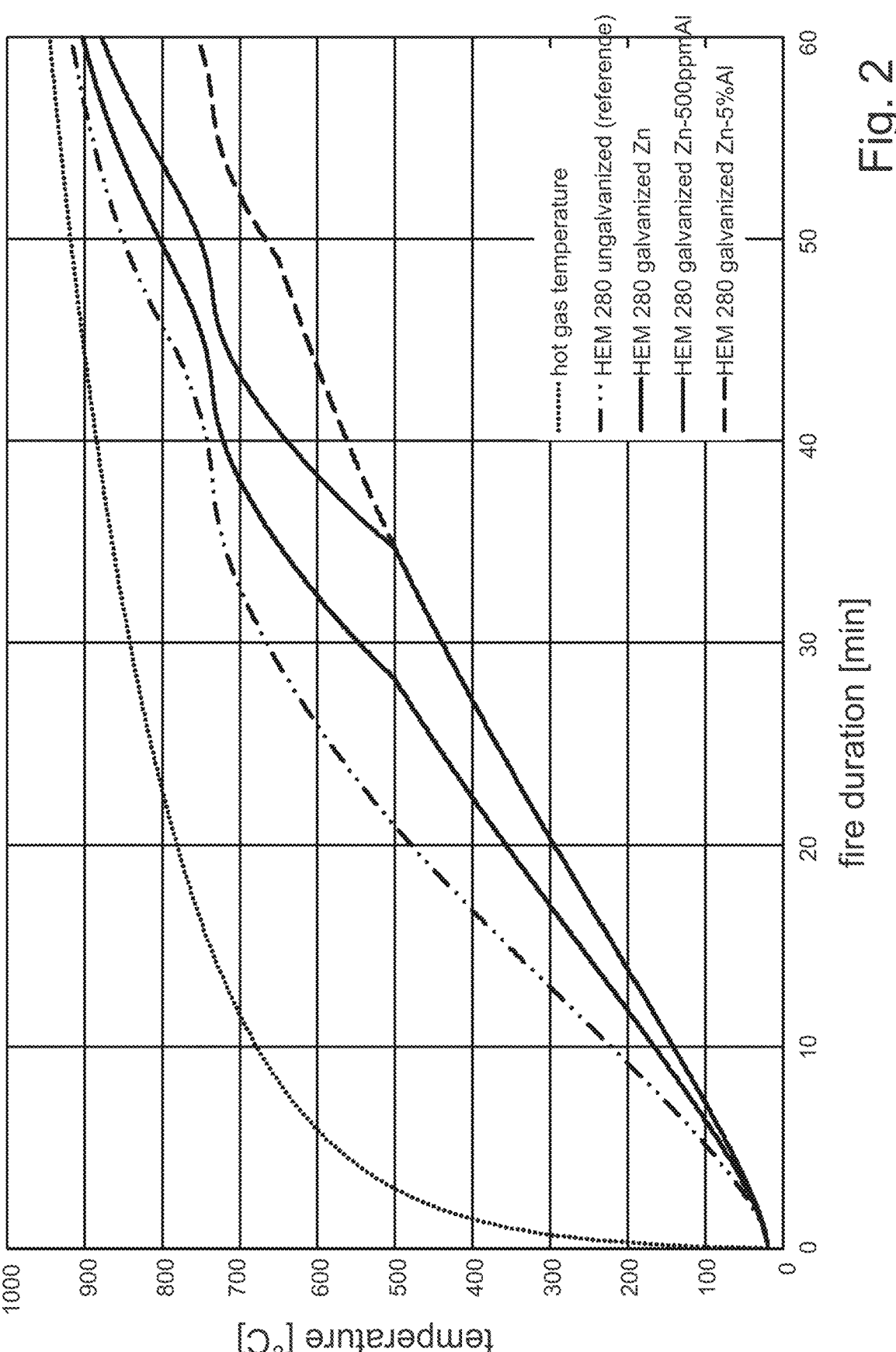
FIG. 2 illustrates the development of the component temperature of various steel components observed in small-scale fire tests (each low-silicon steel, Si content <0.03%; ungalvanized steel component as comparison and/or reference, pure zinc hot-dip galvanized coating with 0% Al as comparison and/or reference, Al-alloyed hot-dip galvanized coating with 500 ppm Al and Al-alloyed hot-dip galvanized coating with 5 wt. % Al according to the invention) as a function of the hot gas temperature, wherein the extent of component heating is significantly reduced with increasing aluminum content.
Figure 3:
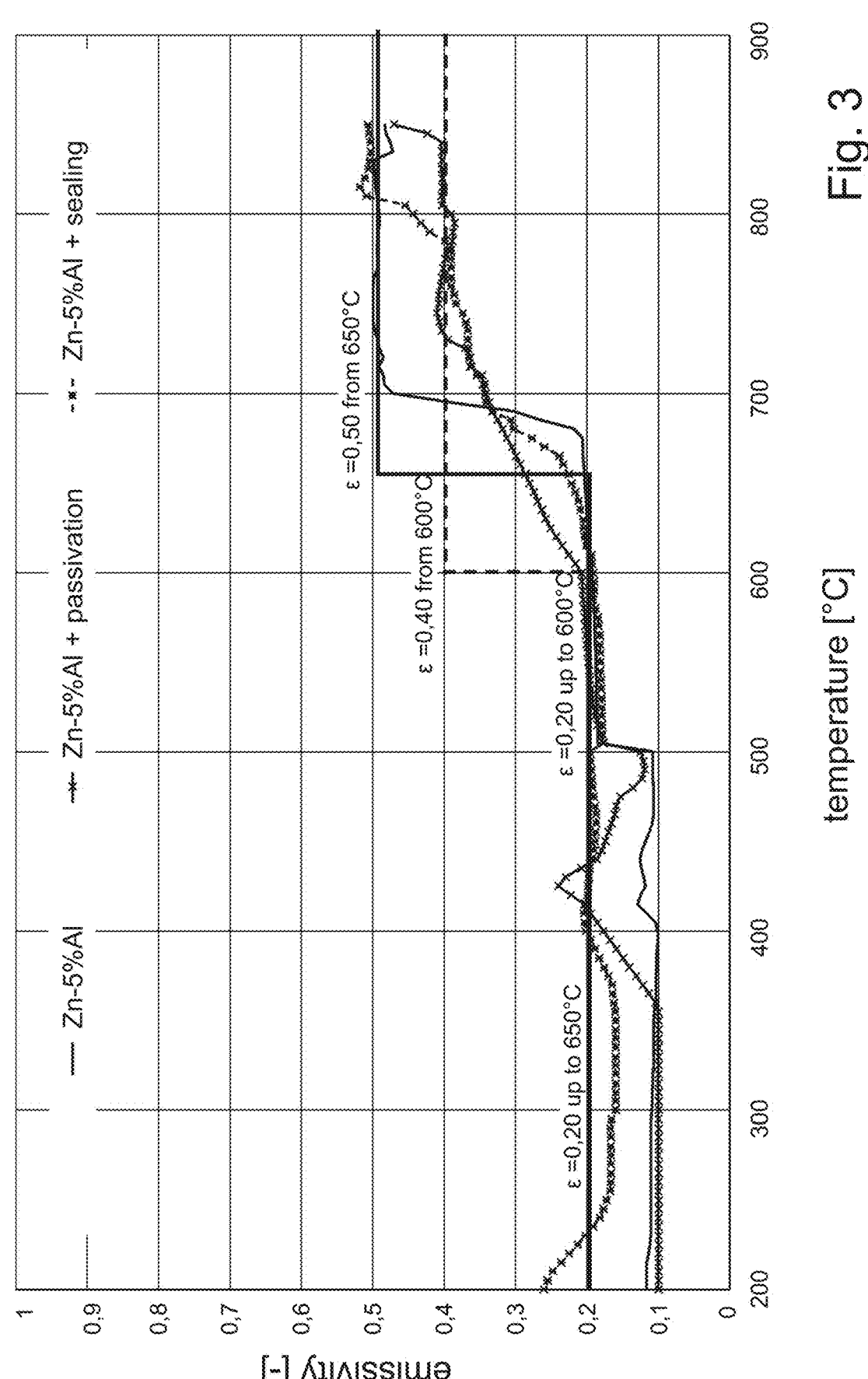
FIG. 3 provides a diagram of the behavior of the emissivity (emission degree) $\varepsilon_m$ of the surface of various steel components (each low-silicon steel, Si content <0.03%) at increasing temperature as a function of additional passivation or sealing at a constant aluminum content in the coating of 5 wt. % (each Al alloyed hot-dip galvanized coating with 5 wt. % Al), wherein the emissivity value is further reduced by the additional passivation or sealing.

In the figure representations shows:

FIG. 1 diagram of the behavior of the emissivity (emission degree) $\varepsilon_m$ of the surface of various steel construction parts (each low-silicon steel, Si content <0.03%) at increasing temperature as a function of the aluminum content in the coating (pure zinc hot-dip galvanized coating with 0% Al as comparison and/or reference, Al-alloyed hot-dip galvanized coating with 500 ppm Al according to the invention and Al-alloyed hot-dip galvanized coating with 5 wt. % Al according to the invention), wherein the emissivity value is significantly reduced with increasing Al-content;

FIG. 2 development of the component temperature of various steel components observed in small-scale fire tests (each low-silicon steel, Si content <0.03%; ungalvanized steel component as comparison and/or reference, pure zinc hot-dip galvanized coating with 0% Al as comparison and/or reference, Al-alloyed hot-dip galvanized coating with 500 ppm Al and Al-alloyed hot-dip galvanized coating with 5 wt. % Al according to the invention) as a function of the hot gas temperature, wherein the extent of component heating is significantly reduced with increasing aluminum content;

FIG. 3 diagram of the behavior of the emissivity (emission degree) $\varepsilon_m$ of the surface of various steel components (each low-silicon steel, Si content <0.03%) at increasing temperature as a function of additional passivation or sealing at a constant aluminum content in the coating of 5 wt. % (each Al-alloyed hot-dip galvanized coating with 5 wt. % Al), wherein the emissivity value is further reduced by the additional passivation or sealing.

Further embodiments, modifications and variations of the present invention are readily apparent to those skilled in the art upon reading the description and can be implemented without departing from the scope of the present invention.

The present invention is illustrated with reference to the following examples, which are not intended to limit the present invention in any way, but merely to explain exemplary and non-limiting methods of implementation and embodiments.

EXAMPLES

General Test Setup and Procedure

The test setup and the test procedure, especially the procedure of the small-scale fire tests, including measurement of the temperature behavior in case of fire, recording of the ETK curves and determination of the emissivity (emission degree) of the steel surface $\varepsilon_m$ is carried out according to the emissivity performance test mentioned in the general description section, as described in detail in: C. Gaigl and M. Mensinger, Technical Report "*Thermal impact on HDG construction*", Technical University of Munich, February 2018, and M. Mensinger and C. Gaigl, paper "*Feuerwiderstand verzinkter Stahlkonstruktionen*", Stahlbau, Vol. 88, pages 3 to 10, January 2019. The determination procedure for the emissivity (emission degree) of the surface $\varepsilon_m$ uses a so-called emissivity performance test, wherein the emissivity (emission degree) of the surface $\varepsilon_m$ (i.e. in accordance with DIN EN 1993-1-2:2006-10) is determined and evaluated from the temperature curve under continuous and/or increasing thermal load (cf. above explanations in the general description).

The temperature measurement in the small-scale experiment was carried out using two infrared (IR) sensors from Optris. The first model "LT" measures in a spectral range of 8 to 14 μm, the second pyrometer of the model "3MH1" measures in the range around the wavelength of 2.3 μm.

Depending on the spectral range, only a certain temperature range is covered. At certain wavelengths, measurements can only be made if the temperatures are sufficiently high.

The higher the radiation intensity, the higher the temperature. The radiation intensity is then shifted into the short-wave spectral range. At low temperatures, little to no radiation is detected in the range of the 2.3 μm sensor. At temperatures above 400° C., the 2.3 μm sensor experiences significantly higher radiation intensity than a sensor measuring in the longer wavelength spectrum. The higher the radiation intensity, the lower the susceptibility to deviations in measurements. For the 3MH1 sensor, only results from temperatures of approx. 200° C. are of importance.

For the temperature measurement in the steel specimens during the test, four thermocouples are used, which are inserted into the 5 mm deep holes of the specimens provided for this purpose. Three specimens are provided for each of the small fire tests.

The emissivity is adjusted in such a way that the temperature of the pyrometers matches the temperature of the thermocouples. A temperature-dependent emissivity can thus be determined by the measurement data acquisition.

The evaluation of the results starts from temperatures of 200° C., since below this temperature the results of the IR sensors do not yet receive enough radiation energy.

Experimental Procedures and Results

Test sheets with a thickness of 10 mm are galvanized in different variations. The emissivity of the different surfaces is then determined in small-scale fire tests.

| alloy of the hot-dip galvanized coating | post treatment | internal designation | steel |
|---|---|---|---|
| pure Zn (Al << 50 ppm)* | — | duroZINQ | low-Si (<0.03%) |
| Zn - 500 ppm Al | — | duroZINQ Al | low-Si (<0.03%) |
| Zn - 0.5% Al | — | | sebisty (Si >0.12%) |
| Zn - 1% Al | — | | sebisty (Si >0.12%) |
| Zn - 5% Al | — | microZINQ | low-Si (<0.03%) |
| Zn - 5% Al | passivation (Cr III - based) | microZINQ + duropass | low-Si (<0.03%) |
| Zn - 5% Al | sealing (silicating) | microZINQ + duroseal | low-Si (<0.03%) |
| Zn - 5% Al | sealing | microZINQ + duroseal | sebisty (Si >0.12%) |

*not inventive

Behavior with Low-Si Steel

In the small-scale fire tests, the behavior of the emissivity with increasing temperature presented in FIG. 1 is shown as a function of the Al-content in the zinc melt or in the coating, respectively. FIG. 1 thus shows the influence of the Al-content on the behavior of the emissivity with increasing temperature (here specifically for steel with low Si-content). In the case of the conventionally galvanized steel component (pure zinc hot-dip galvanized coating), it can be seen that above 500° C., at the latest from 530° C., there is a rapid increase in the emissivity value up to 0.6 at 565° C. and then, continuing at a slower rate, from 735° C. up to above 0.7 (not according to the invention, upper curve). In contrast, even a low Al-content in the hot-dip galvanizing layer of only 500 ppm causes, on the one hand, a significant shift in the increase in the emissivity value toward a higher temperature, namely to 550° C., and, on the other hand, a significant reduction in the emissivity at higher temperatures (middle curve); the emissivity of 0.6 is reached only at a temperature of 615° C. (instead of 565° C.). With an Al-content of 5 wt. % in the zinc melt underlying the zinc coating formation, these positive developments of the emissivity value are again significantly improved (lower curve).

FIG. 1, which concerns the influence of the Al-content in the hot-dip galvanizing layer for low-Si steel (Si<0.03%), thus shows that with increasing Al-content the increase in emissivity shifts towards higher temperatures, with the increase additionally being smaller.

To perform the hot calculation in accordance with DIN EN 1993-1-2, constant emissivity can be derived from the test curves section by section and the development of the component temperature under the standardized unit fire load can be calculated. This shows that a reduced emissivity has the effect that the steel profile heats up more slowly in the case of fire.

FIG. 2 (which shows the development of the component temperature with different zinc coatings on low-Si steel) compares the temperature development for a steel section HEM 280 in the unzinc-galvanized condition (not according to the invention=reference) and with three zinc coatings (pure zinc=not according to the invention; Zn—500 ppm Al and Zn—5% Al). As can be seen in FIG. 2, the higher the Al-content, the slower the same component heats up when galvanized with an Al-containing zinc melt. The unprotected (i.e. non-galvanized) profile shown as a reference heats up fastest compared to all galvanized variants.

For the typical fire classes R30 and R60 in accordance with DIN EN 13501-2:2016-12, for which a fire resistance of the supporting structure of 30 minutes or 60 minutes, respectively, is required, the calculation results in the following temperatures according to the corresponding fire durations:

| Si <0.03% | | emissivity $\varepsilon_m$ | temperature after 30 min | temperature after 60 min |
|---|---|---|---|---|
| ungalvanized* | 0.7 | throughout | 665.5 | 917.1 |
| pure Zn* | 0.35 | 0.7 up to/from 500° C. | 546.7 | 902.9 |
| Zn - 500 ppm Al | 0.2 | 0.7 up to/from 500° C. | 439.7 | 878.6 |
| Zn - 5% Al | 0.2 | 0.5 up to/from 650° C. | 439.7 | 754.8 |

*not inventive

In terms of structural analysis, a lower component temperature at the calculation times (30 minutes or 60 minutes, respectively) means that the steel component under consideration can support a higher ultimate load and is therefore advantageous. Alternatively, if the component temperature is maintained, the size of the component under consideration can be reduced, resulting in mass savings on the steel side.

For the above example, the savings effect is as follows:

| state | profile | profile weight [kg/m] | temperature after 30 minutes |
|---|---|---|---|
| Zn galvanized* | HEM 280 | 189 | 546 |
| Zn - 5% Al | HEB 360 | 142 | 547 |

*not inventive

The steel section required to achieve the same component temperature after 30 minutes of fire exposure can be reduced from a HEM280 steel section to a HEB360 steel section, leading to a weight saving of 47 kg/m.

Behavior with Steel Containing Si

In the case of steel with an Si-content in the sebisty range (Si-content >0.12%), the small-scale fire tests with coatings produced in Al-containing zinc melts again yield emissivity/temperature curves which deviate significantly from the curve with an Al-free zinc coating used as a reference. It can be seen that with increasing Al-content, the rise in the curves is shifted to higher temperatures. Also, the maximum emissivity values are again clearly below 0.7.

As previously described for low-Si steel, constant emissivity can also be derived for these sections to calculate the temperature development under fire load. The resulting results are again determined for a steel section HEM280.

The fire and/or blaze resistance effect according to the invention is thus achieved independently of the steel alloy of the steel component.

Influence of Aftertreatments

With regard to the influence of a passivation or sealing subsequently applied to the Zn/Al coating the small-scale fire tests show that these lead to very similar emissivity to the untreated system. Accordingly, there is an existing positive effect, albeit tending to be minor, with regard to the temperature development (cf. figure according to FIG. 3).

The invention claimed is:

1. A method for providing a steel component with fire-resistance, wherein the method comprises the following steps:

a steel component which is to be provided with fire-resistance is subjected to a hot-dip galvanizing process using an aluminum-containing zinc melt, so as to provide the steel component with an aluminum-containing hot-dip galvanizing layer;

wherein the aluminum-containing hot-dip galvanizing layer is applied to the steel component with a layer thickness in a range of from 4 μm to 25 μm and wherein the aluminum-containing hot-dip galvanizing layer has an aluminum content in a range of from 4 wt. % to 8 wt. %;

wherein the hot-dip galvanizing is performed in such a way and with the proviso that the steel component provided with the aluminum-containing hot-dip galvanizing layer has, at temperatures in a range of from 500° C. to 850° C., an emissivity $\varepsilon_m$ of a surface of the steel component in a range of from 0.05 to 0.60;

wherein the aluminum-containing hot-dip galvanizing layer has the following composition, wherein all quantities stated hereinbelow are to be selected such that a total of 100 wt. % results:

(i) zinc (Zn) in amounts of from 92 wt. % to 96 wt. %, (ii) aluminum (Al) in amounts of from 4 wt. % to 8 wt. %, (iii) at least one further metal which is selected from the group consisting of bismuth (Bi), lead (Pb), tin (Sn), nickel (Ni), silicon (Si), magnesium (Mg) and combinations thereof, in amounts of from 0.001 wt. % to 10 wt. %, with the proviso that a magnesium content is less than 0.2 wt. %.

2. The method according to claim 1, wherein fire-resistance is adjusted and controlled by means of at least one of:

(i) thickness of the aluminum-containing hot-dip galvanizing layer, (ii) composition of the aluminum-containing hot-dip galvanizing layer, (iii) formation of the aluminum-containing hot-dip galvanizing layer during the hot-dip galvanizing, (iv) aluminum content of the aluminum-containing hot-dip galvanizing layer, and combinations thereof.

3. The method according to claim 2, wherein, with an increase of at least one of the aluminum content and of the layer thickness of the aluminum-containing hot-dip galvanizing layer, the fire-resistance is increased.

4. The method according to claim 1, wherein the steel component provided with the aluminum-containing hot-dip galvanizing layer has, at temperatures in a range of from 500° C. to 850° C., an emissivity $\varepsilon_m$ of the surface in the range of from 0.05 to 0.55.

5. The method according to claim 1, wherein the steel component provided with the aluminum-containing hot-dip galvanizing layer has, at temperatures in a range of from 500° C. to 650° C., an emissivity $\varepsilon_m$ of the surface of at most 0.40 and wherein the steel component provided with the aluminum-containing hot-dip galvanizing layer has, at temperatures in a range of from 650° C. to 850° C., an emissivity $\varepsilon_m$ of the surface of at most 0.60.

6. The method according to claim 1, wherein the steel of the steel component is selected from the group consisting of (i) low silicon steel with a silicon content ≤0.03 wt. % and with a phosphorus content <0.02 wt. %, based on the steel; (ii) Sandelin steel with a silicon content between 0.03 wt. % and 0.14 wt. %, based on the steel; (iii) Sebisty steel with a silicon content between 0.14 wt. % and 0.25 wt. %, based in the steel; (iv) high silicon steel with a silicon content >0.25 wt. %, based on the steel; and combinations thereof.

7. The method according to claim 1, wherein the steel component is selected from the group consisting of a steel beam, a steel sheet, a steel tube and combinations thereof.

8. The method according to claim 1, wherein the steel component is a steel component for at least one of construction and building industry and automobile industry.

9. The method according to claim 1, wherein hot-dip galvanizing is performed at a temperature in a range of from 375° C. to 750° C., and for a time in the range of from 0.0001 to 60 minutes.

10. The method according to claim 1, wherein the hot-dip galvanizing comprises the following method steps in an order as listed hereinbelow:

(a) degreasing treatment of the steel component in at least one degreasing bath;

(b) rinsing the steel component degreased in method step (a) in at least one rinsing bath;

(c) pickling treatment of the steel component degreased in method step (a) and rinsed in method step (b) in at least one pickling bath;

(d) rinsing the steel component pickled in method step (c) in at least one rinsing bath;

(e) flux treatment of the steel component pickled in method step (c) and rinsed in method step (d) by means of a flux composition in a flux bath;

(f) drying treatment of the steel component subjected to flux treatment in method step (e);

(g) hot-dip galvanizing of the steel component subjected to flux treatment in method step (e) and dried in method step (f) in an aluminum-containing zinc melt by dipping the steel component in the aluminum-containing zinc melt.

11. A steel supporting structure for a construction, wherein the steel supporting structure comprises, as structural construction components for complying with requirements of fire-resistance, a plurality of structural construction steel components each provided with an aluminum-containing hot-dip galvanizing layer;

wherein the steel supporting structure is free of additional structural fire-protection measures and devices and wherein the steel supporting structure does not comprise any additional structural fire-protection elements;

wherein the structural construction steel components provided with the aluminum-containing hot-dip galvanizing layer each have, at temperatures in a range of from 500° C. to 850° C., an emissivity $\varepsilon_m$ of a surface in a range of from 0.05 to 0.60, wherein the aluminum-containing hot-dip galvanizing layer has the following composition, wherein all quantities stated below are to be selected such that a total of 100 wt. % results:

(i) zinc (Zn) in amounts of from 92 wt. % to 96 wt. %, (ii) aluminum (Al) in amounts of from 4 wt. % to 8 wt. %, (iii) at least one further metal which is selected from the group consisting of bismuth (Bi), lead (Pb), tin (Sn), nickel (Ni), silicon (Si), magnesium (Mg) and combinations thereof, in amounts of from 0.001 wt. % to 10 wt. %, with the proviso that a magnesium content is less than 0.2 wt. %.

12. The steel supporting structure according to claim 11, wherein the supporting structure is designed to be used as a supporting structure for a building or for a part of a building.

13. The steel supporting structure according to claim 11, wherein the structural construction steel components provided with the aluminum-containing hot-dip galvanizing layer each have, at temperatures in a range of from 500° C. to 850° C., an emissivity $\varepsilon_m$ of the surface in a range of from 0.05 to 0.55.

14. The steel supporting structure according to claim 11, wherein the structural construction steel components provided with the aluminum-containing hot-dip galvanizing layer each have, at temperatures in a range of from 500° C. to 650° C., an emissivity $\varepsilon_m$ of the surface of at most 0.40 and wherein the structural construction steel components provided with the aluminum-containing hot-dip galvanizing layer each have, at temperatures in a range of from 650° C. to 850° C., an emissivity $\varepsilon_m$ of the surface of at most 0.60.

15. The steel supporting structure according to claim 11, wherein the steel of the structural construction steel components is selected from the group consisting of (i) low silicon steel with a silicon content ≤0.03 wt. % and with a phosphorus content <0.02 wt. %, based on the steel; (ii) Sandelin steel with a silicon content between 0.03 wt. % and 0.14 wt. %, based on the steel; (iii) Sebisty steel with a silicon content between 0.14 wt. % and 0.25 wt. %, based in the steel; (iv) high silicon steel with a silicon content >0.25 wt. %, based on the steel; and combinations thereof.

16. The steel supporting structure according to claim 11, wherein the structural construction steel components are selected from the group consisting of, steel beams, steel sheets, steel tubes and combinations thereof.

17. A construction, wherein the construction comprises a supporting structure according to claim 11.

18. The construction according to claim 17, wherein the construction is a building or a part of a building.

19. Use of an aluminum-containing hot-dip galvanizing layer for producing fire-resistance on or onto a steel component and for providing a steel component with fire-resistance, wherein a steel component which is to be provided with fire-resistance is subjected to a hot-dip galvanizing process using an aluminum-containing zinc melt, so as to provide the steel component with an aluminum-containing hot-dip galvanizing layer;

wherein the aluminum-containing hot-dip galvanizing layer is applied to the steel component with a layer thickness in a range of from 4 μm to 25 μm and wherein the aluminum-containing hot-dip galvanizing layer has an aluminum content in a range of from 4 wt. % to 8 wt. %;

wherein the hot-dip galvanizing is performed in such a way and with the proviso that the steel component provided with the aluminum-containing hot-dip galvanizing layer has, at temperatures in a range of from 500° C. to 850° C., an emissivity $\varepsilon_m$ of a surface of the steel component in a range of from 0.05 to 0.60;

wherein the aluminum-containing hot-dip galvanizing layer has the following composition, wherein all quantities stated hereinbelow are to be selected such that a total of 100 wt. % results:

(i) zinc (Zn) in amounts of from 92 wt. % to 96 wt. %, (ii) aluminum (Al) in amounts of from 4 wt. % to 8 wt. %, (iii) at least one further metal which is selected from the group consisting of bismuth (Bi), lead (Pb), tin (Sn), nickel (Ni), silicon (Si), magnesium (Mg) and combinations thereof, in amounts of from 0.001 wt. % to 10 wt. %, with the proviso that a magnesium content is less than 0.2 wt. %.

20. A method for providing a steel-based article with fire-resistance, wherein the method comprises the following steps:

a steel-based article which is to be provided with fire-resistance is subjected to a hot-dip galvanizing process using an aluminum-containing zinc melt, so as to provide the steel-based article with an aluminum-containing hot-dip galvanizing layer;

wherein the aluminum-containing hot-dip galvanizing layer is applied to the steel-based article with a layer thickness in a range of from 4 μm to 25 μm and wherein the aluminum-containing hot-dip galvanizing layer has an aluminum content, based on the aluminum-containing hot-dip galvanizing layer, in a range of from 4 wt. % to 8 wt. %;

wherein the hot-dip galvanizing is performed in such a way and with the proviso that the steel-based article provided with the aluminum-containing hot-dip galvanizing layer has, at temperatures in a range of from 500° C. to 850° C., an emissivity $\varepsilon_m$ of a surface of the steel-based article in a range of from 0.05 to 0.60;

wherein the aluminum-containing hot-dip galvanizing layer has the following composition, wherein all quantities stated hereinbelow are to be selected such that a total of 100 wt. % results:

(i) zinc (Zn) in amounts of from 92 wt. % to 96 wt. %, (ii) aluminum (Al) in amounts of from 4 wt. % to 8 wt. %, (iii) at least one further metal which is selected from the group consisting of bismuth (Bi), lead (Pb), tin (Sn), nickel (Ni), silicon (Si), magnesium (Mg) and combinations thereof, in amounts of from 0.001 wt. % to 10 wt. %, with the proviso that a magnesium content is less than 0.2 wt. %.

* * * * *